(12) United States Patent
Strub

(10) Patent No.: US 9,467,793 B2
(45) Date of Patent: Oct. 11, 2016

(54) SYSTEMS, METHODS, AND APPARATUS FOR RECORDING THREE-DIMENSIONAL AUDIO AND ASSOCIATED DATA

(71) Applicant: Strubwerks, LLC, Folsum, LA (US)

(72) Inventor: Tyner Brentz Strub, Folsum, LA (US)

(*) Notice: Subject to any disclaimer, the term of this patent is extended or adjusted under 35 U.S.C. 154(b) by 170 days.

(21) Appl. No.: 14/135,852

(22) Filed: Dec. 20, 2013

(65) Prior Publication Data

US 2014/0177846 A1   Jun. 26, 2014

Related U.S. Application Data

(60) Provisional application No. 61/740,035, filed on Dec. 20, 2012, provisional application No. 61/801,278, filed on Mar. 15, 2013.

(51) Int. Cl.
| | |
|---|---|
| H04R 5/00 | (2006.01) |
| H04R 5/02 | (2006.01) |
| H04S 5/00 | (2006.01) |
| G10L 19/008 | (2013.01) |
| G06F 3/033 | (2013.01) |
| H04S 1/00 | (2006.01) |
| H04S 3/00 | (2006.01) |

(52) U.S. Cl.
CPC .............. *H04S 5/00* (2013.01); *G06F 3/0334* (2013.01); *G10L 19/008* (2013.01); *H04S 1/002* (2013.01); *H04S 3/002* (2013.01); *H04S 2400/11* (2013.01)

(58) Field of Classification Search
CPC .... H04R 2217/03; H04R 5/02; H04R 5/027; H04R 5/04
USPC ........... 381/17, 302, 23, 27, 300, 307; 360/7
See application file for complete search history.

(56) References Cited

U.S. PATENT DOCUMENTS 3,710,034 A * 1/1973 Murry ...................... G11B 5/00
                                                          360/7
5,583,407 A   12/1996 Yamaguchi
(Continued)

FOREIGN PATENT DOCUMENTS

| EP | 1134724 A2 | 9/2001 |
| EP | 1954019 A1 | 8/2008 |
| WO | 2005022285 A2 | 3/2005 |

OTHER PUBLICATIONS

Search Report and Written Opinion for International Application No. PCT/US2013/076846 mailed Jun. 6, 2014.
(Continued)

*Primary Examiner* — Thjuan K Addy
(74) *Attorney, Agent, or Firm* — Sutherland Asbill & Brennan LLP

(57) ABSTRACT

Embodiments can include systems, methods, and apparatus for recording three-dimensional audio and associated data. In one embodiment, an apparatus can include a base, a stick operable to move in either an X-axis direction or a Y-axis direction with respect to the base, a pedal operable to mount to a portion of the stick and receive a user input in either the X-axis direction or the Y-axis direction, and a sliding mechanism operable to facilitate sliding the pedal with respect to the base, wherein the pedal is further operable to receive another user input to correspond to a Z-axis direction. In certain embodiments, the apparatus can also include a locking mechanism operable to receive a user input to limit sliding the pedal with respect to the base.

11 Claims, 27 Drawing Sheets

(56) References Cited

U.S. PATENT DOCUMENTS

| | | | | |
|---|---|---|---|---|
| 5,764,777 | A | * | 6/1998 | Goldfarb .................. H04R 1/02 |
| | | | | 381/27 |
| 8,908,874 | B2 | * | 12/2014 | Johnston ............... G10L 19/008 |
| | | | | 381/23 |
| 2008/0129683 | A1 | | 6/2008 | Li |
| 2010/0260342 | A1 | | 10/2010 | Strub |
| 2012/0308056 | A1 | * | 12/2012 | Nakayama ............. B60Q 9/008 |
| | | | | 381/302 |

OTHER PUBLICATIONS

"3D Sound Authoring Tool SoundLocus User Manual." XP055106615. Retrieved from the Internet: <http://www.soundlocus.com/pdf/Win/en/SoundlocusUsersManual.pdf>. May 25, 2011. pp. 4-5, 35-40, 56, 69, and 77.

"Guitar Effects & Amp Simulator G5." XP055120397. Retrieved from the Internet: <http://www.zoom.co.jpfdownload/E_G5.pdf>. Apr. 14, 2012. pp. 1-65.

* cited by examiner

| spkrs/map | Left | Right | L. Surr. | R. Surr. | Top Front | Top Rear |
|---|---|---|---|---|---|---|
| 1 | + | 0 | 0 | 0 | + | 0 |
| 2 | + | + | - | - | + | 0 |
| 3 | 0 | + | - | 0 | + | 0 |
| 4 | + | - | + | - | + | + |
| 5 | 0 | 0 | 0 | 0 | + | + |
| 6 | - | + | - | + | + | + |
| 7 | 0 | - | + | 0 | 0 | + |
| 8 | - | - | + | + | - | + |
| 9 | - | 0 | 0 | + | 0 | + |
| 10 | + | 0 | 0 | - | 0 | - |
| 11 | + | + | - | - | 0 | 0 |
| 12 | 0 | + | - | 0 | 0 | - |
| 13 | + | - | + | - | 0 | 0 |
| 14 | 0 | 0 | 0 | 0 | 0 | 0 |
| 15 | - | + | - | + | 0 | 0 |
| 16 | 0 | - | + | 0 | - | 0 |
| 17 | - | - | + | + | 0 | 0 |
| 18 | - | 0 | 0 | + | - | 0 |
| 19 | + | 0 | 0 | - | - | off |
| 20 | + | + | - | - | 0 | - |
| 21 | 0 | + | - | 0 | - | off |
| 22 | + | - | + | - | - | - |
| 23 | 0 | 0 | 0 | 0 | - | - |
| 24 | - | + | - | + | - | - |
| 25 | 0 | - | + | 0 | off | - |
| 26 | - | - | + | + | - | 0 |
| 27 | - | 0 | 0 | + | off | - |

FIG. 16

(Use method for 3D unit)

(Recording sound file generation)

SYSTEMS, METHODS, AND APPARATUS FOR RECORDING THREE-DIMENSIONAL AUDIO AND ASSOCIATED DATA

CROSS-REFERENCE TO RELATED APPLICATIONS

This application claims benefit of U.S. Ser. No. 61/740,035, titled "Systems, Methods, and Apparatus for Assigning Three-Dimensional Spatial Data to Sounds and Audio Files," filed on Dec. 20, 2012; and further claims benefit of U.S. Ser. No. 61/801,278, titled "Systems and Methods for Providing Three Dimensional Enhanced Audio," filed Mar. 15, 2013, the contents of both are hereby incorporated by reference in their entirety.

FIELD OF THE DISCLOSURE

The disclosure generally relates to sound audio processing, and more particularly, to systems, methods, and apparatus for recording three-dimensional audio and associated data.

BACKGROUND

The terms "multi-channel audio" or "surround sound" generally refer to systems that can produce sounds that appear to originate from multiple directions around a listener. With the recent proliferation of computer games and game consoles, such as the Microsoft® X-Box®, the PlayStation®3 and the various Nintendo®-type systems, some game designers want to achieve "complete immersion" of players within the games. The conventional and commercially available systems and techniques including Dolby® Digital, DTS®, and Sony® Dynamic Digital Sound (SDDS) may be used to reproduce sound in the horizontal plane (azimuth), but such conventional systems may not adequately reproduce sound effects in elevation to recreate the experience of sounds coming from overhead or underfoot.

Certain conventional surround sound systems utilize a "hula hoop" approach to providing sound effects. However, this conventional approach may not mirror a human's true perception of sound, nor allow for accurate overhead sound placement. Another conventional surround sound system utilizes up to 64 speakers in theater listening environments. However, this conventional system may not be cost effective for certain users or listeners, such as in a home theater listening environment.

SUMMARY OF THE DISCLOSURE

Embodiments of the disclosure can address some or all of the needs described above. According to embodiments of the disclosure, disclosed are systems, methods, and apparatus for recording three-dimensional audio and associated data.

In one embodiment, a system can be provided. The system can include at least one processor in communication with at least one memory, the at least one processor operable to execute computer-executable instructions. The system can also include an input device operable to receive a user input corresponding with sonic spatial data in a predefined listening environment, and transmit the user input to at least one processor. The computer-executable instructions can be operable to receive the user input, convert the user input to sonic spatial data, associate the sonic spatial data with a time code, and store the sonic spatial data, audio signal, and time code.

In at least one embodiment, the computer-executable instructions can be further operable to format the sonic spatial data, audio signal, and time code for storage to a 3D-EA audio output file.

In at least one embodiment, the input device can include at least one of the following: a foot pedal, a joystick device, a hand controlled device, light sensor, a gesture control device, or a voice input device.

In at least one embodiment, the user input can include X, Y, and Z-axis coordinate data.

In at least one embodiment, the computer-executable instructions can be operable to convert the user input to sonic spatial data comprising computer-executable instructions operable to determine at least one adjustment to volume or delay in the audio signal.

In another embodiment, an apparatus can be provided. The apparatus can include a base, a stick operable to move in either an X-axis direction or a Y-axis direction with respect to the base, a pedal operable to mount to a portion of the stick and receive a user input in either the X-axis direction or the Y-axis direction, and a sliding mechanism operable to facilitate sliding the pedal with respect to the base, wherein the pedal is further operable to receive another user input to correspond to a Z-axis direction.

In at least one embodiment, the apparatus can include a locking mechanism operable to receive a user input to limit sliding the pedal with respect to the base.

In at least one embodiment, the locking mechanism can be further operable to be depressed to limit sliding the pedal with respect to the base; and further operable to be depressed again to permit sliding the pedal with respect to the base.

In at least one embodiment, the apparatus can further include a wireless communication interface, a display device, a start/stop switch, a millisecond delay, and a decibel unit counter or selector.

In yet another embodiment, a method can be provided. The method can include receiving a user input via an input device, wherein the user input indicates an X-axis direction or a Y-axis direction corresponding to sonic spatial data associated with an audio signal, and receiving an additional user input via the input device, wherein the additional user input indicates a Z-axis direction corresponding to sonic spatial data associated with an audio signal.

In at least one embodiment, the method can include converting the received user inputs to sonic spatial data, and storing the sonic spatial data with an audio signal and a time code in a 3D-EA audio output file.

In at least one embodiment, the method can include converting the received user inputs to sonic spatial data, and formatting the sonic spatial data with an audio signal and a time code for storage in a 3D-EA audio output file.

In at least one embodiment, the input device can include a pedal mounted to a stick supported by a support base, and further wherein the input device comprises a sliding mechanism operable to slide the pedal with respect to the support base.

In at least one embodiment, the input device can include a locking mechanism operable to limit sliding of the pedal with respect to the support base.

In at least one embodiment, the input device can include at least one of the following: a foot pedal, a joystick device, light sensor, a hand controlled device, a gesture control device, or a voice input device.

Other embodiments, features, and aspects of the disclosure are described in detail herein and are considered a part of the claimed disclosure. Other embodiments and aspects can be understood with reference to the following detailed description, accompanying drawings, and proposed claims.

BRIEF DESCRIPTION OF THE DRAWINGS

Reference will now be made to the accompanying tables and drawings, which are not necessarily drawn to scale, and wherein:

FIG. 16 illustrates an example look-up table of relative speaker volume levels for placement of sound at the 3D-EA localization regions of FIG. 6, according to an example embodiment of the disclosure.

DETAILED DESCRIPTION

Figure 1:
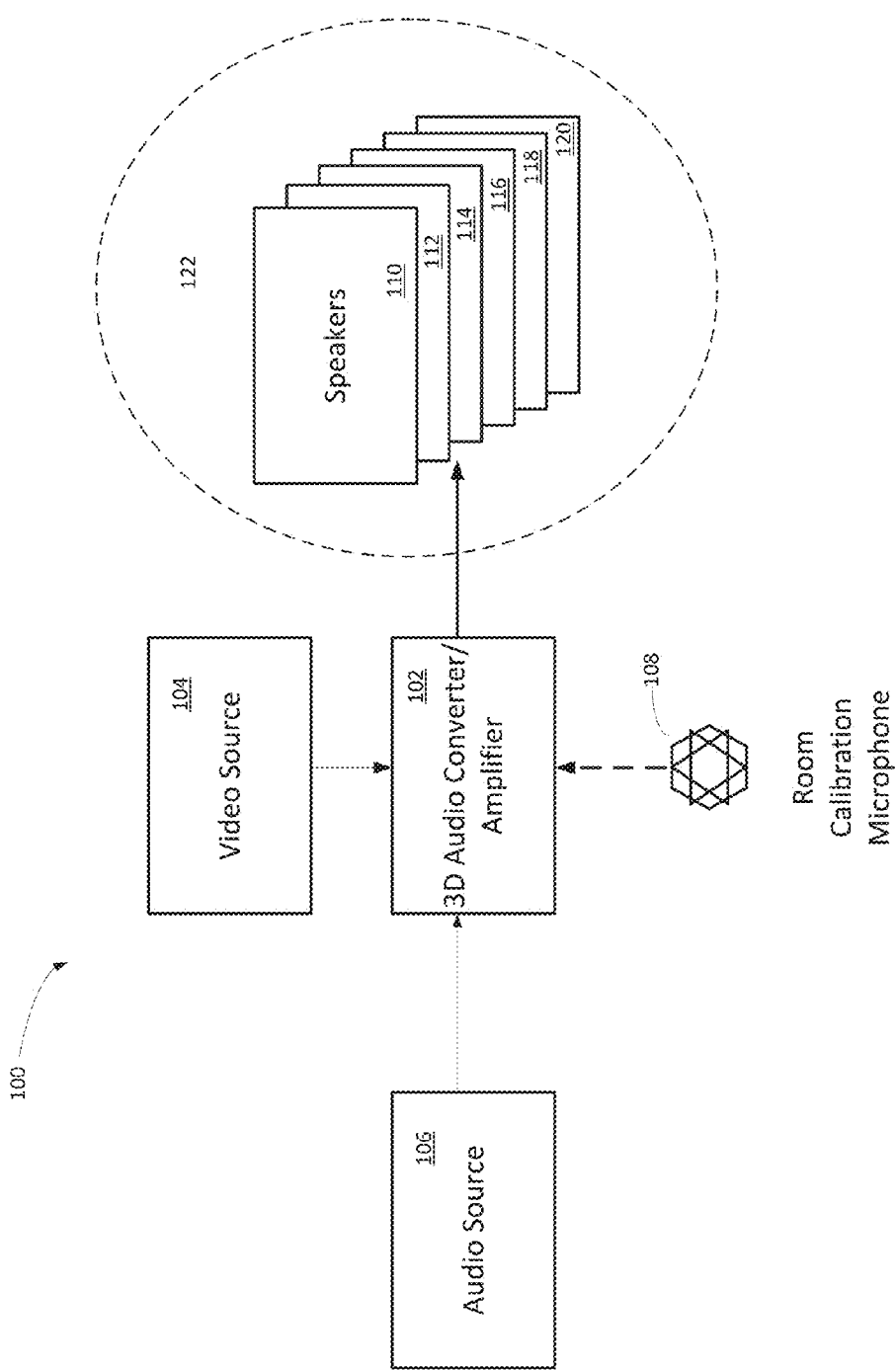
FIG. 1 depicts a block diagram of an example 3D-EA system for playback of 3-D audio, in accordance with an embodiment of disclosure.

Embodiments of the disclosure will now be described more fully hereinafter with reference to the accompanying drawings. This disclosure may, however, be embodied in many different forms and should not be construed as limited to the embodiment set forth herein; rather, embodiments are provided so that this disclosure will be thorough and complete, and will convey the scope of the disclosure.

In one embodiment of the disclosure, systems, methods, and apparatus are provided for simulating or creating a 3-D, or virtual, listening environment. According to another example embodiment of the disclosure, systems, methods, and apparatus are provided for 3-D audio playback and content creation. In at least one embodiment, a 3-D enhanced audio (3D-EA) system can be provided. A 3D-EA system can, in at least one embodiment, include a 3D-EA playback component device, which can simulate a 3-D listening environment from a 2-D (stereo) output or otherwise accept multi-channel 3-D audio content. In another embodiment, 3D-EA system can include a foot pedal controller device and associated controller interface component device, both of which can facilitate 3D-EA content creation. In yet another embodiment, a 3D-EA system can include at least six output speakers specifically positioned or otherwise located in a unique configuration to create a realistic, dome-shaped 3-D listening environment or sound field surrounding a user or listener.

In certain embodiments, a 3D-EA system can manipulate various sound elements within a dome-shaped sound field, created by at least six speakers, by coordinating sound pressure levels (volume) and delays according to a sonic spatial map (SSM) algorithm. Conventional sound systems could generate and output sounds that could appear to originate from the left or right, and in some cases from the rear in a limited fashion. Using the 3D-EA system, sounds can be generated and output to appear from the left, right, front, rear, above and below a user or listener. When sounds generated by the 3D-EA system are paired with a video element from, for example, a video source, the generated sounds can more accurately track the video element, or what is happening on a viewing screen.

In certain embodiments, a 3D-EA system can provide user-friendly interfaces, such as a foot pedal controller device and associated controller interface component device, for 3D-EA content creation. For example, during live performances and/or soundtrack design, a foot pedal controller device of a 3D-EA system can be utilized by a user to generate sonic spatial data (SSD). The SSD can be transmitted to the associated controller interface component device, which can process and store the SSD in a 3D-EA file, 3D-EA audio output file, encoded audio file and/or 3D-EA format, such as sonic data file (SDF) or sonic data format.

Thus, one or more technical solutions can be achieved by certain embodiments of the disclosure, including, but not limited to, providing a more immersive listening experience for a user or listener, such as a home theater user, a video game player, a musician, or a DJ.

Example 3D-EA Playback Component Device

FIG. 1 depicts an example system 100 in accordance with an embodiment of disclosure. The 3-D audio converter/amplifier 102, also known as a 3D-EA playback component device, can accept and process audio from an external audio source 106, which may include, for example, the stereo audio output from a gaming console, the stereo audio from a standard CD player, tape deck, or other hi-fi stereo source, from a DVD player, or the like. The audio source 106 and video source 104 may be connected to separate input ports of the 3-D audio converter/amplifier, or the audio source 106 and video source 104 may be combined through one cable, such as HDMI, and the audio and video may be separated within the 3-D audio converter/amplifier 102 for further processing.

According to an example embodiment of the disclosure, the 3-D converter/amplifier 102 may provide both input and output jacks for example, to allow video to pass through for a convenient hook-up to a display screen. Detailed embodiments of the 3-D audio converter/amplifier 102 will be explained below in reference with FIG. 2, but in general, the 3-D audio converter/amplifier 102 may provide processing, routing, splitting, filtering, converting, compressing, limiting, amplifying, attenuating, delaying, panning, phasing, mixing, sending, bypassing, etc., to produce, or re-produce 3D-EA sounds in a listening environment in both a horizontal plane (azimuth) and vertical plane (height) around a user or listener.

According to an example embodiment, the 3-D audio converter/amplifier 102 may include an input for a video source 104. In an example embodiment of the disclosure, the 3D-EA sound localization, or apparent directionality of the sonic information may be encoded and/or produced in relation to the position of objects within the 2-dimensional plane of a video image. According to other embodiments of the disclosure, object position information encoded into the audio can be processed by the 3-D audio converter/amplifier 102 for dynamic positioning and/or placement of multiple 3D-EA sounds within a listening environment 122 and optionally correlated with the positioning and/or placement of multiple objects in an associated video.

According to an example embodiment of the disclosure a speaker array, including, for example, speakers 110-120, may be in communication with the 3-D audio converter/amplifier 102, and may be responsive to the signals produced by the 3-D audio converter/amplifier 102. Although six speakers 110-120 are illustrated in the embodiment of FIG. 1, more than six speakers can be used with other embodiments. In one embodiment, system 100 may also include a room calibration microphone 108, as depicted in FIG. 1. According to an example embodiment, the room calibration microphone 108 may contain one or more diaphragms, or may be omni-directional, for detecting sound simultaneously from one or more directions. The room calibration microphone 108 may be responsive to the time-varying sound pressure level signals produced by the speakers 110-120, and may provide calibration input to the 3-D audio converter/amplifier 102 for proper setup of the various parameters (processing, routing, splitting, equalization, filtering, converting, compressing, limiting, amplifying, attenuating, delaying, panning, mixing, sending, bypassing, for example) within the 3-D audio converter/amplifier 102 to calibrate system 100 for a particular room. The room calibration microphone 108 may also be utilized in combination with a calibration tone generator within the 3-D audio converter/amplifier 102, and speakers 110-120 appropriately placed in the listening environment, to automatically calibrate the system 100. The details of this calibration procedure, in accordance with example embodiments of the disclosure will be discussed with respect to certain figures below.

Figure 2:
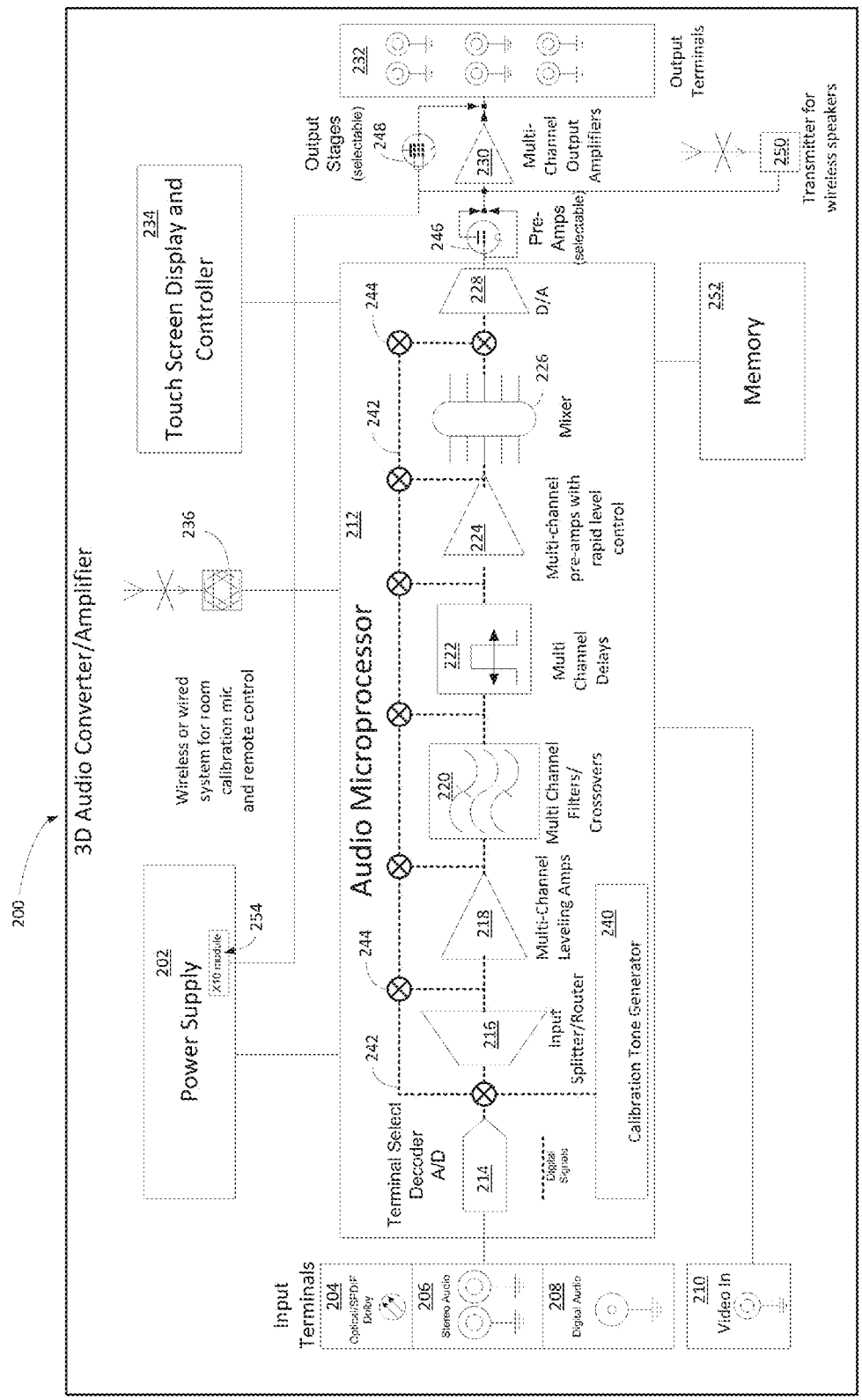
FIG. 2 illustrates a hardware schematic for an example playback component device for a 3D-EA system, in accordance with an example embodiment of the disclosure.

FIG. 2 depicts a block diagram representation of an example 3-D audio converter/amplifier 200, similar to 102 in FIG. 1, according to an example embodiment of the disclosure. Input terminals 204-210 can be utilized for receiving one or more input audio and/or video signal sources, including pre-processed 3D-EA. The input terminals 204-210 may include multiple input terminals to facilitate a variety of source connections including, but not limited to, RCA, XLR, S/PDIF, digital audio, coaxial, optical, ¼" stereo or mono, ⅛" mini stereo or mono, DIN, HDMI and other types of standard connections. According to an example embodiment, the audio input terminals 204, 206, 208 may be in communication with at least one audio microprocessor, such as 212. At least one of the microprocessors, such as 212, may be in communication with a memory device 252 and may either reside on the same or different integrated circuits.

According to an example embodiment of the disclosure, at least one of the audio microprocessors, such as 212, may include a terminal select decoder A/D module 214, which may receive signals from the input terminals 204-208. The decoder 214 may be in communication with an input splitter/router 216, which may be in communication with multi-channel leveling amplifiers 218. The multi-channel leveling amplifiers 218 may be in communication with multi-channel filters/crossovers 220 which may be in communication with a multi-channel delay module 222. The multi-channel delay module 222 may be in communication with multi-channel pre-amps 224, which may be in communication with a multi-channel mixer 224, which may be in communication with an output D/A converter 228. The output of the audio microprocessor 212 may be in communication with multiple and selectable preamps 246. The output from either the D/A converter 228, or the preamps 246, or a mix of both, may be in communication with multi-channel output amplifiers 230 and a transmitter 250 for the wireless speakers. The output of the output stages 248 and/or the multi-channel output amplifiers 230, or a mix of both, may be in communication with output terminals 232 which are further in communication with speakers. According to an example embodiment, the transmitter 250 for the wireless speakers may be in communication with a receiver associated with the wireless speaker (not shown). According to an example embodiment, a routing bus 242 and summing/mixing/routing nodes 244 may be utilized to route and connect all digital signals to-and-from any of the modules described above within the audio microprocessor 212.

The 3-D audio converter/amplifier 200 may also include a touch screen display and controller 234 in communication with the at least one audio microprocessor 212 for controlling and displaying the various system settings. According to an example embodiment, the 3-D audio converter/amplifier 200 may include a wireless system for communication with the room calibration microphone 108, shown in FIG. 1, and a wireless remote control. A power supply 202 may provide power to all the circuits of the 3-D audio converter/amplifier 200.

According to an example embodiment, the 3-D audio converter/amplifier 200 may include one or more input terminals 210 for video information. For example, one terminal may be dedicated to video information, while another is dedicated to video time code. Optionally, the video input terminals 210 may be in communication with a video microprocessor (not shown). The optional video microprocessor 238 may be in further communication with the at least one audio microprocessor 212.

Again with reference to FIG. 2, blocks of the at least one audio microprocessor 212 within the 3-D audio converter/amplifier 200 will now be explained, according to example embodiments of the disclosure. The input terminal select decoder and A/D module 214 may selectively receive and transform the one or more input audio signals from the input terminals 204-208 (or from other input terminals) as needed. According to an example embodiment, if information is present at the Optical/SPDIF terminal 204 in the form of a digital optical signal, the decoder 214 may detect the presence of the optical signal, and may perform the appropriate switching and optical to electrical conversion. According to example embodiments of the disclosure, the decoder 214 may automatically select input terminals via a signal detection process, or it may require manual input by the user, particularly in the case where multiple input signals may be present, and when one particular input is desired. According to example embodiments of the disclosure, the terminal select decoder and A/D module 214 may include additional sub-modules for performing terminal sensing, terminal switching, transformations between optical and electrical signals, sensing the format of the digital or analog signal, and performing transformations from analog to digital signals. According to an example embodiment, analog audio signals may be converted to digital signals via an A/D converter within the terminal select decoder A/D module 214, and as such, may remain in digital format until converted back to analog at the D/A module 228 prior to being amplified and sent to the speakers. Conversely, digital signals present on the input terminals may bypass the A/D sub module processing since they are already in the digital format. The signal flow in FIG. 2 indicates digital signals as dashed lines, according to an example embodiment of the disclosure, however, according to other example embodiments of the disclosure, input signals (analog or digital) may be routed to bypass one or more of the modules 216-228, and yet in other embodiments of the disclosure, one or more of the modules 214-228 may include the capability to process either digital or analog information.

With continued reference to FIG. 2, and according to an example embodiment of the disclosure, a multi-signal bus 242 with multiple summing/mixing/routing nodes 244 may be utilized for routing, directing, summing, mixing, signals to and from any of the modules 214-228, and/or the calibration tone generator 240. According to an example embodiment, the input splitter/router module 216 may receive digital signals from decoder 214, and may act as an input mixer/router for audio signals, either alone, or in combination with the bus 242 and the summing/mixing/routing nodes 244. The input splitter/router module 216 may also receive a signal from the calibration tone generator 240 for proper routing through the rest of the system. According to an example embodiment of the disclosure, the input splitter/router module 216 may perform the initial audio bus 242 input routings for the audio microprocessor 212, and as such, may be in parallel communication with the downstream modules, which will be briefly described next.

According to an example embodiment of the disclosure, the at least one audio microprocessor 212 may include multi-channel leveling amplifiers 218 that may be utilized to normalize the incoming audio channels, or to otherwise selectively boost or attenuate certain bus 242 signals. According to an example embodiment, the leveling amps 218 may precede the input splitter/router 216. According to an example embodiment, the leveling amps 218 may be in parallel communication with any of the modules 220-228 and 240 via a parallel audio bus 242 and summing/mixing/routing nodes 244. According to an example embodiment, the at least one audio microprocessor 212 may also include a multi-channel filter/crossover module 220 that may be utilized for selective equalization of the audio signals. According to an example embodiment, one function of the multi-channel filter/crossover module 220 may be to selectively alter the frequency content of certain audio channels so that, for example, only relatively mid- and high frequency information is directed to, for example, a top center front 118 and top center rear 120 speaker shown in FIG. 1, or so that only the low frequency content from all channels is directed to a subwoofer speaker.

With continued reference to FIG. 2, and according to an example embodiment, the at least one audio microprocessor 212 may include a multi-channel delay module 222, which may receive signals from upstream modules 214-220, 240, in any combination via a parallel audio bus 242 and summing/mixing/routing nodes 244, or by the input splitter router 216. The multi-channel delay module 222 may be operable to impart a variable delay to the individual channels of audio that may ultimately be sent to the speakers. The multi-channel delay module 222 may also include a submodule that may impart phase delays, for example, to selectively add constructive or destructive interference within a listening environment 122, such as a 3D-EA listening sphere or dome, or to adjust the size and position of the listening environment 122, or 3D-EA listening sphere or dome.

According to an example embodiment of the disclosure, the at least one audio microprocessor 212 may further include a multi-channel-preamp with rapid level control 224. This module 224 may be in parallel communication with all of the other modules in the at least one audio microprocessor 212 via a parallel audio bus 242 and summing/mixing/routing nodes 244, and may be controlled, at least in part, by the encoded 3-D information, either present within the audio signal. An example function provided by the multi-channel-preamp with rapid level control 224 may be to selectively adjust the volume of one or more channels so that the 3D-EA sound may appear to be directed from a particular direction. In certain embodiments, this may also be achieved by one or more spatial data files during a 3D-EA content creation process, according to certain embodiments of the disclosure. According to an example embodiment of the disclosure, a mixer 226 may perform the final combination of the upstream signals, and may perform the appropriate output routing for directing a particular channel. The mixer 226 may be followed by a multiple channel D/A converter 228 for reconverting all digital signals to analog before they are further routed. According to one example embodiment, the output signals from the D/A 228 may be optionally amplified by the pre-amps 246 and routed to transmitter 250 for sending to wireless speakers. According to another example embodiment, the output from the D/A 228 may be amplified by one or more combinations of (a) the pre-amps 246, (b) the multi-channel output amplifiers 230, or (c) before being directed to the output terminals 232 for connecting to the speakers. According to an example embodiment of the disclosure, the multi-channel output amplifiers 230 may include protection devices to minimize any damage to speakers hooked to the output terminals 232, or to protect the amplifiers 230 from damaged or shorted speakers, or shorted terminals 232.

According to an example embodiment certain 3D-EA output audio signals can be routed to the output terminals 232 for further processing and/or computer interfacing. In certain instances, an output terminal 232 may include various types of home and/or professional quality outputs including, but not limited to, XLR, AESI, Optical, USB, Firewire, RCA, HDMI, quick-release or terminal locking speaker cable connectors, Neutrik Speakon connectors, etc.

According to example embodiments of the disclosure, speakers for use in the 3-D audio playback system may be calibrated or initialized for a particular listening environment as part of a setup procedure. The setup procedure may include the use of one or more calibration microphones 236. In an example embodiment of the disclosure, one or more calibration microphones 236 may be placed within about 10 cm of a listener position. In an example embodiment, calibration tones may be generated and directed through speakers, and detected with the one or more calibration microphones 236. In certain embodiments of the disclosure, the calibration tones may be generated, selectively directed through speakers, and detected. In certain embodiments, the calibration tones can include one or more of impulses, chirps, white noise, pink noise, tone warbling, modulated tones, phase shifted tones, multiple tones or audible prompts.

According to example embodiments, the calibration tones may be selectively routed individually or in combination to a plurality of speakers. According to example embodiments, the calibration tones may be amplified for driving the speakers. According to example embodiments of the disclosure, one or more parameters may be determined by selectively routing calibration tones through the plurality of speakers and detecting the calibration tones with the calibration microphone 236. For example, the parameters may include one or more of phase, delay, frequency response, impulse response, distance from the one or more calibration microphones, position with respect to the one or more calibration microphones, speaker axial angle, volume, speaker radial angle, or speaker azimuth angle. In accordance with an example embodiment of the disclosure, one or more settings, including volume, and/or delay, may be modified in each of the speakers associated with the 3D-EA system based on the calibration or setup process. In accordance with embodiments of the disclosure, the modified settings or calibration parameters may be stored in memory 252. In accordance with an example embodiment of the disclosure, the calibration parameters may be retrieved from memory 252 and utilized to automatically initialize the speakers upon subsequent use of the system after initial setup.

Figure 3A:
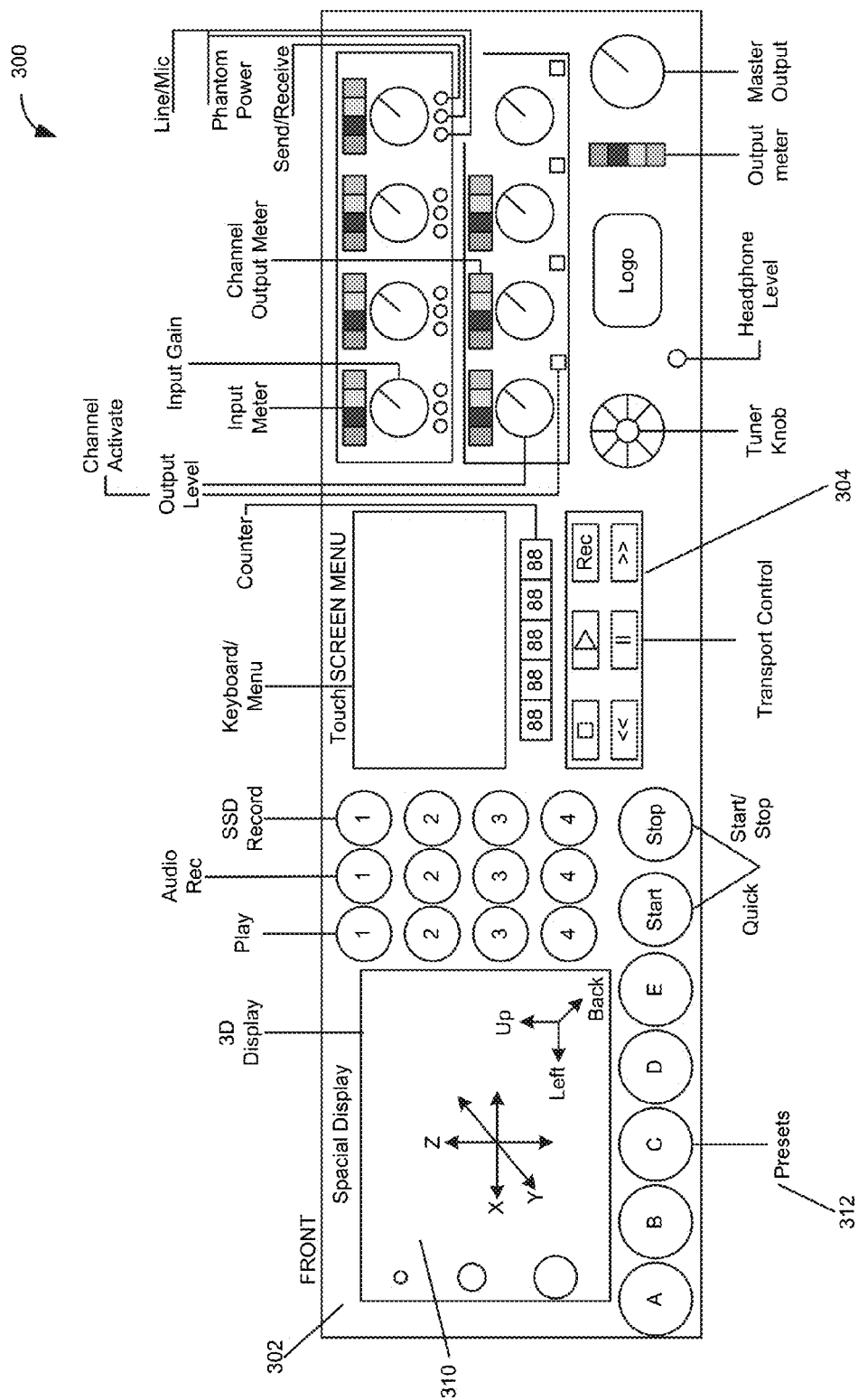
FIG. 3 illustrates a hardware and user interface schematic for an example playback component device for a 3D-EA system, in accordance with an example embodiment of the disclosure.
Figure 3B:
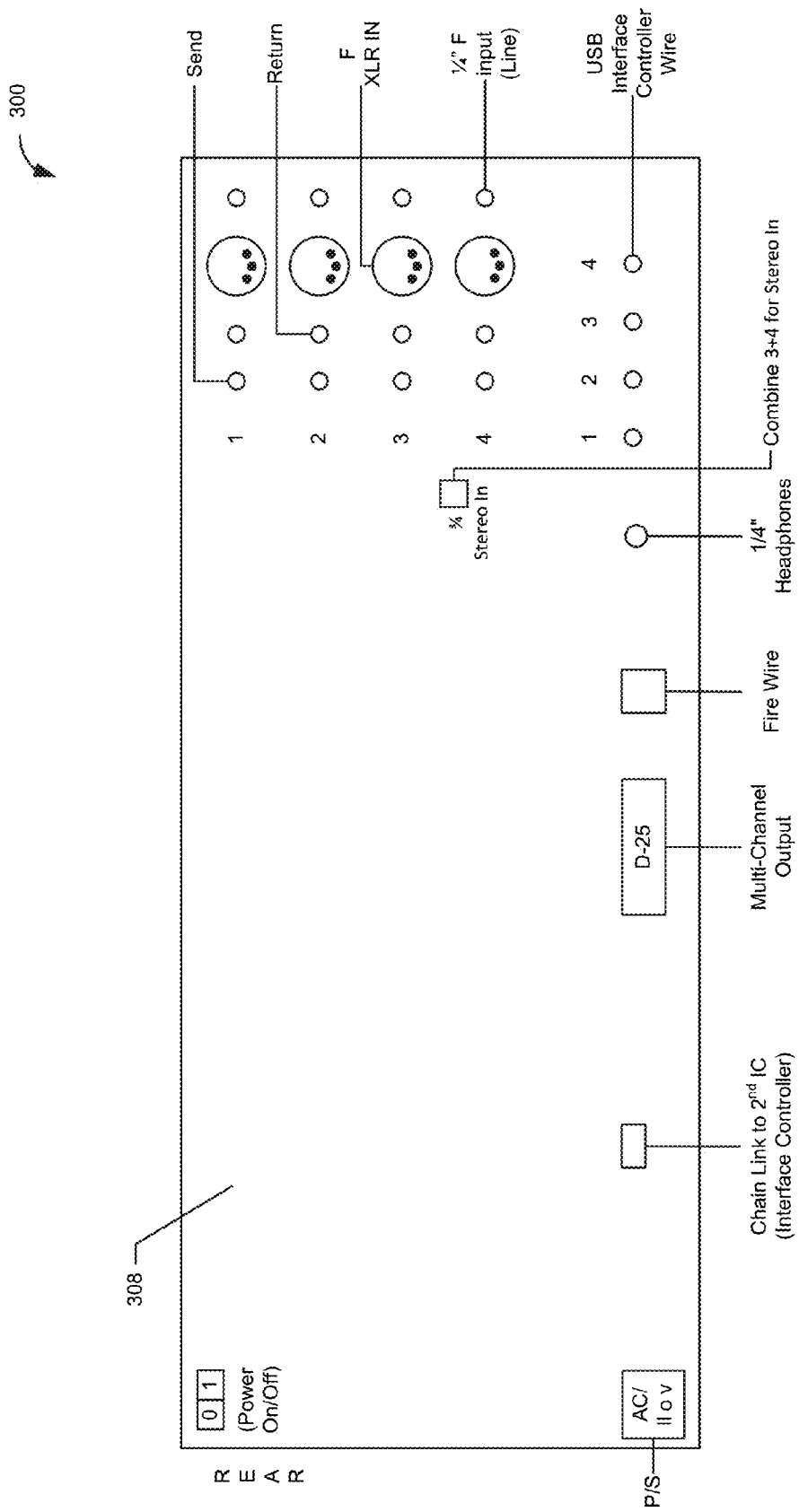

Turning to FIG. 3, various hardware and user interfaces for an example 3D-EA playback component device 300 are shown. In this embodiment, a 3D-EA playback component device 300 can have various capabilities to record, playback, and mix any number of audio sources or signals. For example, the 3D-EA playback component device 300 can record, playback, and mix at least four analog audio channels simultaneously with or without sonic spatial data (SSD). In the embodiment shown in FIG. 3, the device 300 can have at least four user accessible sections including, but not limited to, a front panel spatial display and pre-set section or portion 302, a transport control section or portion 304, an input control section or portion, and a rear section or portion 308.

The front portion 302 of the device 300 in FIG. 3 is shown in the lower portion 308 of the figure, and the rear portion of the device 300 is shown in the upper portion of the figure. The device 300 can be operable to receive one or more signal sources, wherein the device 300 can process the one or more signal sources similar to the processing described with respect to the system 100 in FIG. 1. The signal sources can include, but are not limited, a mobile phone, a smartphone, a music file player, a gaming console, a tablet, a computer, a laptop computer, the stereo audio from a standard CD player, tape deck, or other hi-fi stereo source, a mono audio source (such as instruments like guitars, bass, mics, etc.), or a source from a DVD player, and the like. The device 300 can process the one or more signal sources to produce, or reproduce 3D-EA sounds via one or more speakers, such as 110-120, in a listening environment. The one or more speakers can be, a 6.0 or 6.1 array of speakers.

Any number of control inputs and/or outputs can be used with the device 300 shown in FIG. 3. For example, control inputs and/or outputs can include, but are not limited to, a 3-D display 310 indicating X-, Y-, and Z-axis data, preset buttons 312, start and stop buttons, audio data file (ADF) play and record buttons, spatial data file (SDF) play and record buttons, a touchscreen interface and/or menu, a time code indicator or counter, transport control functionality, channel active/solo, an input gain meter, a input gain level, a channel output meter, a line/mic, phantom power, send/return, a tuner knob, a headphone jack such as a ¼" jack, a headphone level, an output meter, an output level/mix, and a master output level meter, and a master output level. Other embodiments can include similar and/or other control inputs and/or outputs.

In the embodiment shown in FIG. 3, the 3-D display 310 can provide a 3-D simultaneous representation of some or all four channels. In certain instances, a representative marker identifying certain inputs, such as channels 1-4, can be designated on the 3-D display 310 by a respective number in the marker. For example, the marker can indicate a 3-D position of each channel on the 3-D display 310, and each marker can pulsate to indicate relative signal strength. In some instances, the marker can change color, such as to red, to indicate clip. In some instances, the marker can move in real time according to a spatial data file (SDF).

Furthermore, in the embodiment shown in FIG. 3, the preset buttons 312 can include programmable preset buttons, such as 1-5 buttons. These preset buttons 312 can store sonic spatial data sets, such as up to 5 data sets, which can be selected by a user operating the front panel of device 300 or by the user manipulating an input control device or other foot pedal input control device, similar to 800 shown in FIGS. 8-14. In certain instances, each of the preset buttons 312 can include a quick assignment feature that permits a user to quickly assign a respective preset button with a particular channel, such as channels 1-4. In some instances, some or all of a memory bank, such as 1-100 ADF or SDF, can be assigned to store the channel assigned to each preset button 312. In use, when a user selects a particular channel button by pressing the desired channel button, the user can then quickly assign a corresponding preset button 312 by pressing the desired preset button. The memory bank can store the user's selection of the channel button and preset button 312 for subsequent recall of the previously stored channel when a user selects a particular preset button.

Moreover, in the embodiment shown in FIG. 3, the start and stop buttons, and the ADF and SDF play and record buttons or controls can be used to respectively record and/or playback sonic spatial data (SSD) and/or spatial data files (SDFs) for a particular channel, such as channels 1-4. For example, to record a SDF to an assigned channel, a user can select a respective SDF record button, then select the start button. By way of further example, to play an ADF of an assigned channel, a user can select a respective ADF play button, then select the start button.

In certain instances, if neither a play nor record button is selected for a particular channel, the channel will accept audio and sonic spatial data for playthrough.

In the embodiment shown in FIG. 3, the touchscreen interface and/or menu can display information about active channels, provide a pop-up keyboard for data entry, facilitate preset button assignment, and facilitate file management, such as save, delete, and assign operations.

In the embodiment shown in FIG. 3, the transport control functionality can include a touchscreen display or respective command buttons and/or controls for stop, play, pause, forward, fast or quick forward, rewind, and fast or quick rewind. Each of the 4 audio channels can have respective controls as previously defined. In certain instances, each track can have transport controls for searching and playing audio tracks.

Further, in the embodiment shown in FIG. 3, the tuner knob can include a flywheel tuner knob with a depressible function select feature to provide relatively fine tuning and/or control.

Moreover, in the embodiment shown in FIG. 3, one or more audio input controls can be provided. The input controls can provide gain control, level meters, and buttons for phantom power and insert for send/return, output level control and indicators, output enable buttons for each channel, a master volume control, and a master level meter.

Turning to the rear portion of the device 300, any number of control inputs and/or outputs can be used. In the embodiment shown in FIG. 3, control inputs and/or outputs can include, but are not limited to, a power on/off switch, a power supply connector interface, a chain link to second interface controller (IC), a multi-channel (1-6+sub-out) output connector (D-25), a Firewire input/output, a headphone output jack, at least 4 mono audio channel inputs, a series of send inputs, a series of return inputs, a set of front XLR or ¼ inch TRS inputs, and a USB input/output. The four inputs can have an option for phantom power and/or inserts for connecting auxiliary audio equipment. Connections for up to 4 input control devices, similar to 800 shown in FIGS. 8-14, or similar foot pedals, can be provided. Each of these connections can provide or otherwise control sonic spatial data (SSD) for a specified input channel. Using at least some of the inputs and/or outputs of the rear portion of the device 300, multiple units can be interfaced with the device 300. Other embodiments can include similar and/or other control inputs and/or outputs.

In one embodiment, a 3D-EA playback component device, such as 300, can operate with one or more powered speakers of any power rating. For example, the 3-D audio playback unit can be used with a variety of speakers, such as 20 W, 40 W, 100 W, 200 W, 1000 W speakers. Thus, in this embodiment, the 3D-EA playback component device 300 does not have to provide amplification of the signal sources since powered speakers are utilized with the unit. Further, the 3D-EA playback component device 300 can be configured with any number of input and/or output interfaces to suitably accommodate the one or more signal sources. For example, the 3D-EA playback component device 300 can include interfaces such as, but not limited to, XLR, AESI, Optical, USB, Firewire, RCA, HDMI, quick-release or terminal locking speaker cable connectors, Neutrik Speakon connectors, etc.

In use, a 3D-EA playback component device 300, can be used to receive, monitor, and adjust sonic spatial data (SSD) in any number of signal sources. The device 300 can provide a user with a variety of input and output controls to receive, monitor, and adjust SSD as well as conventional audio signals. In this manner, editing, mixing, and recording SSD with other audio signals can be performed using the 3D-EA playback component device 300.

In certain embodiments, the 3D-EA playback component device 300 can include one or more modules with a set of computer-executable instructions to convert or enhance the received two channel audio signal to a six channel audio signal. The one or more modules can also include a set of computer-executable instructions to playback or otherwise output a two channel signal via a 3D-EA array of speakers. Further, the one or more modules can include a set of computer-executable instructions to playback or otherwise output a converted or enhanced six channel signal via a 3D-EA array of speakers.

Figure 4:
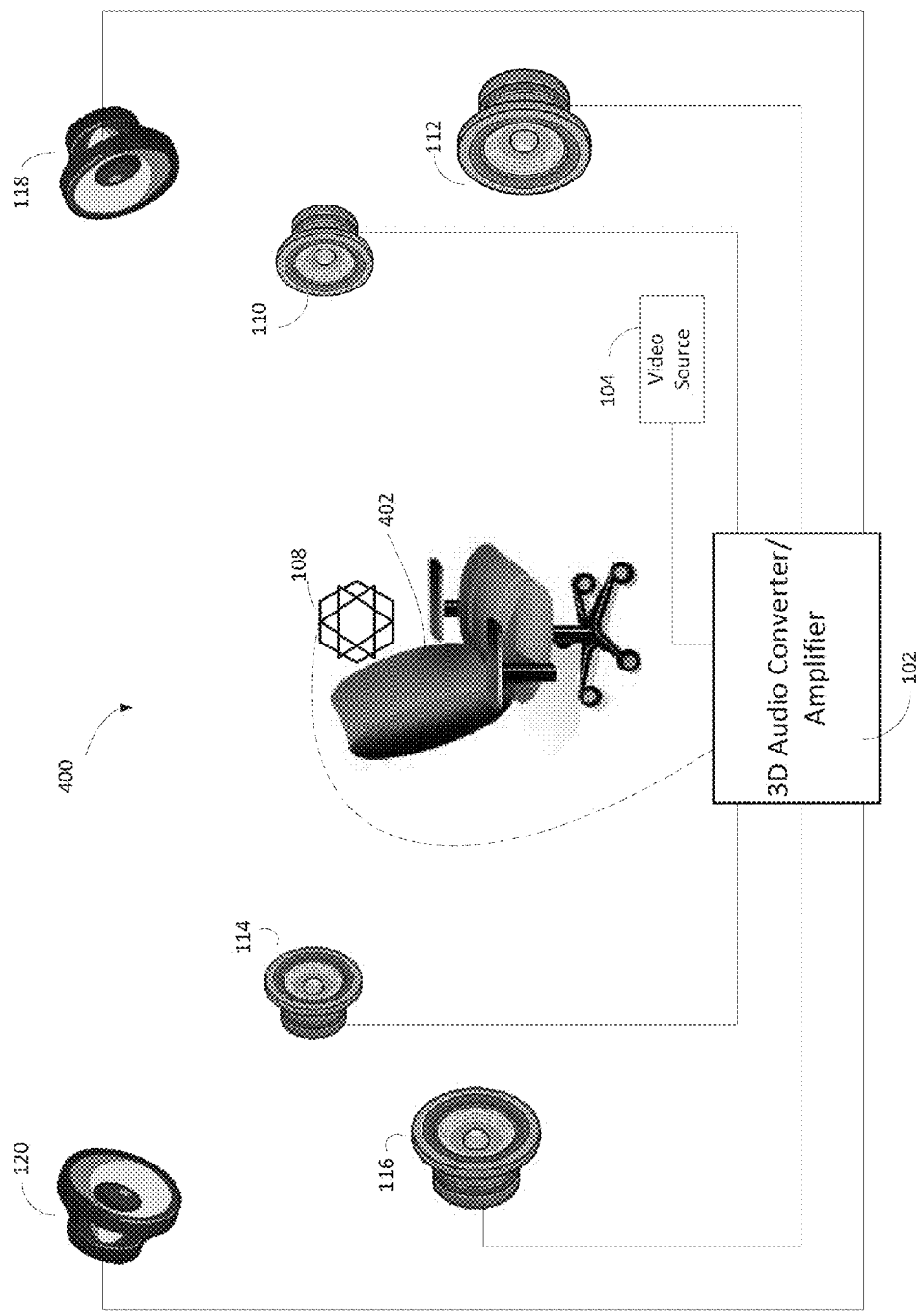
FIG. 4 illustrates an example speaker perspective arrangement for a 3D-EA system in accordance with an embodiment of the disclosure.

FIG. 4 illustrates an example speaker perspective arrangement, or 3D-EA speaker array, for an example listening environment 400, similar to 122 in FIG. 1, for a 3D-EA system in accordance with an embodiment of the disclosure. According to an example embodiment the speakers, in communication with the 3-D audio converter/amplifier 102, can be designated as Left 110, Right 112, Left Surround 114, Right Surround 116, Top Center Front 118, and Top Center Rear 120. According to other example embodiments, the number and physical layout of speakers can vary within the environment 400, and may also include a subwoofer (not shown). In accordance with an example embodiment of the disclosure, the Left 110, Right 112, Left Surround 114, and Right Surround 116, speakers can be located at predefined positions with respect to the listener position 402. For example, the Left 110 and Right 112 can be positioned at about ear level about 30 to 40 degrees off center, such as at about 35 degrees off center; the Left Surround 114 and Right Surround 116 can be positioned at about ear level about 110 to 130 degrees off center, such as about 120 degrees off center; the Top Center Front 118 can be positioned at about 8-9 feet above ear level tilted 10 to 20 degrees toward the listener; and the Top Center Rear 120 can be positioned about 8-9 feet above ear level tilted 10 to 20 degrees toward the listener. In one example, an approximate equilateral triangle can be formed between the Left 110 speaker, the Right 112 speaker, and the listener position 402. In another example, the Left 110 and Right 112 speakers can be oriented such that an acute angle of the isosceles triangle formed between the speakers 110, 112 and the listener position 402 is between approximately 40 and approximately 60 degrees.

FIG. 4 also illustrates a Top Center Front speaker 118 and a Top Center Rear speaker 120 in accordance with an embodiment of the disclosure. These speakers 118, 120 can respectively, be placed at front and rear of the listening environment 400, vertically elevated above the listener position 402, and can be angled downwards by approximately 10 to approximately 65 degrees to direct sound downwards towards the listener(s). The Top Center Front 118 speaker can be placed in the front of the environment 400 or room, typically above a viewing screen (not shown), and the Top Center Rear 120 speaker can be placed behind and above the listener position 402. In this embodiment, the Top Center Rear 120 and Top Center Front 118 speakers may be pointed downwards at an angle towards the listener at listener position 402 so that the actual sonic reflections vibrate selective regions of cartilage within the ears of the listener to engage vertical or azimuth directional perception. According to an example embodiment of the disclosure, one or more of the speakers may be connected directly to the 3-D audio converter/amplifier 102 using two conductor speaker wires. According to another example embodiment of the disclosure, one or more of the speakers may be connected wirelessly to the 3-D audio converter/amplifier 102.

Also depicted in FIG. 4 is the room calibration microphone 108. As will be discussed further with respect to certain figures below, the calibration microphone 108 may be wired or wireless, and may be in communication with the 3-D audio converter/amplifier 102. According to an example embodiment, the calibration microphone, in cooperation with the 3-D audio converter/amplifier 102, and speakers 110-120 may be utilized for any of the following: (a) to calibrate the speakers 110-120 for a particular room or listening environment 400, (b) to aid in the setup and placement of the individual speakers for optimum 3D-EA performance, (c) to setup the equalization parameters for the individual channels and speakers, and/or (d) to utilize feedback to set the various parameters, speaker placements, etc. In certain embodiments, the above calibration process can be used to calibrate all speakers to PAR. That is, the speakers can be calibrated to sound as if they are all of equal distance and loudness to a listener. This can be facilitated by adjusting the volume and delay of respective speakers, such as the Left Surround 114, Right Surround 116, Top Center Front 118 and Top Center Rear 120 speakers, relative to the Left 110 and Right 112 speakers in simulation and 3D-EA playback modes.

In one example embodiment, the speaker arrangement of FIG. 4 can be calibrated by positioning the overhead speakers 118, 120 towards a listener standing in a central part of the room or environment 400, when the speaker arrangement is used for a listener in a seated position in a central part of the room or environment 400. That is, the speaker arrangement of FIG. 4 can be directed slightly above the ear level of a seated listener in a central part of the room or environment 400.

Figure 5:
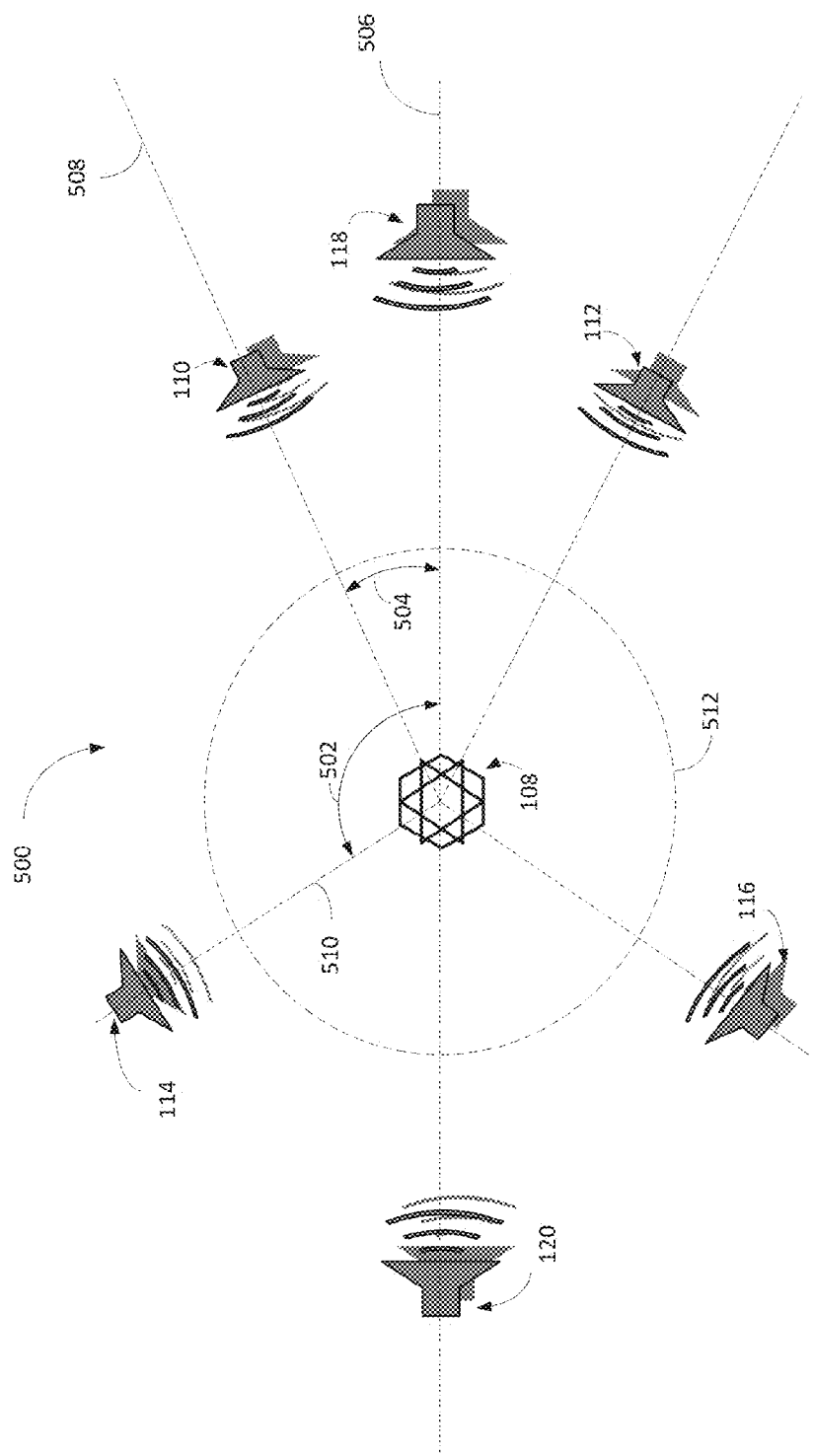
FIG. 5 illustrates an example speaker placement top-down view for a 3D-EA system, in accordance with an embodiment of the disclosure.

FIG. 5 shows a top-down view of an example 3D-EA listening environment 500, or 3D-EA speaker array, similar to 122 in FIG. 1 and/or 400 in FIG. 4, in accordance with an example embodiment of the disclosure. As measured with respect to the center line 506 bisecting the Top Center Front 118 and Top Center Rear 120 speakers, the Left 110 speaker may be centered on line 508 extending from position of the listener to form an angle 504 with the center line 506. Depending on the room configuration and other factors related to the optimum 3D-EA sound, the angle 504 may change. For example, the Left 110 and Right 112 speakers can be positioned at about ear level about 30 to 40 degrees off center, such as at about 35 degrees off center; the Left Surround 114 and Right Surround 116 speakers can be positioned at about ear level about 110 to 130 degrees off center, such as about 120 degrees off center; the Top Center Front 118 speaker can be positioned at about 8-9 feet above ground level tilted 10 to 20 degrees toward the listener; and the Top Center Rear 120 speaker can be positioned about 8-9 feet above ground level tilted 10 to 20 degrees toward the listener. The Right 112 and Right Surround 116 speakers may be placed in a mirror image with respect to the centerline 506 respectively with the Left 110 and Left Surround 114 speakers. As depicted in FIGS. 4 and 5, the Top Center Front 118 and Top Center Rear 120 speakers may be placed on about the centerline (as their name suggest) and, as with the other speakers, may be pointed to direct 3D-EA sound towards the listener. According to example embodiments of the disclosure, the linear distance between the listener at listening position 402 (FIG. 4), as depicted by the position of the calibration microphone 108 (FIG. 4), and the individual speakers 110-120 may vary, and may depend on the room configuration, room physical limitations, factors related to the optimum 3D-EA sound, and size of 3D-EA listening sphere or dome 512 needed in order to reproduce 3D-EA sounds for one or more listeners. Typically, a 3D-EA listening sphere or dome 512 will have a radius smaller than the distance to the closest speaker 110-120. However, according to an example embodiment of the disclosure, the size of the 3-D listening sphere or dome 512 may be expanded or contracted by selective processing, routing, volume control, and/or phase control of the driving energy directed to each of speakers 110-120. In certain embodiments, equidistant placement of some or all of the speakers from a listener within a 3-D listening sphere or dome 512 may be optimal.

In one example embodiment, the speaker arrangement of FIG. 5 can be tested by positioning the speakers at about 5 feet, 7 feet, and 10 feet from the listener, each speaker being equidistant from the listener, to create a PAR condition and similar performance.

Figure 6:
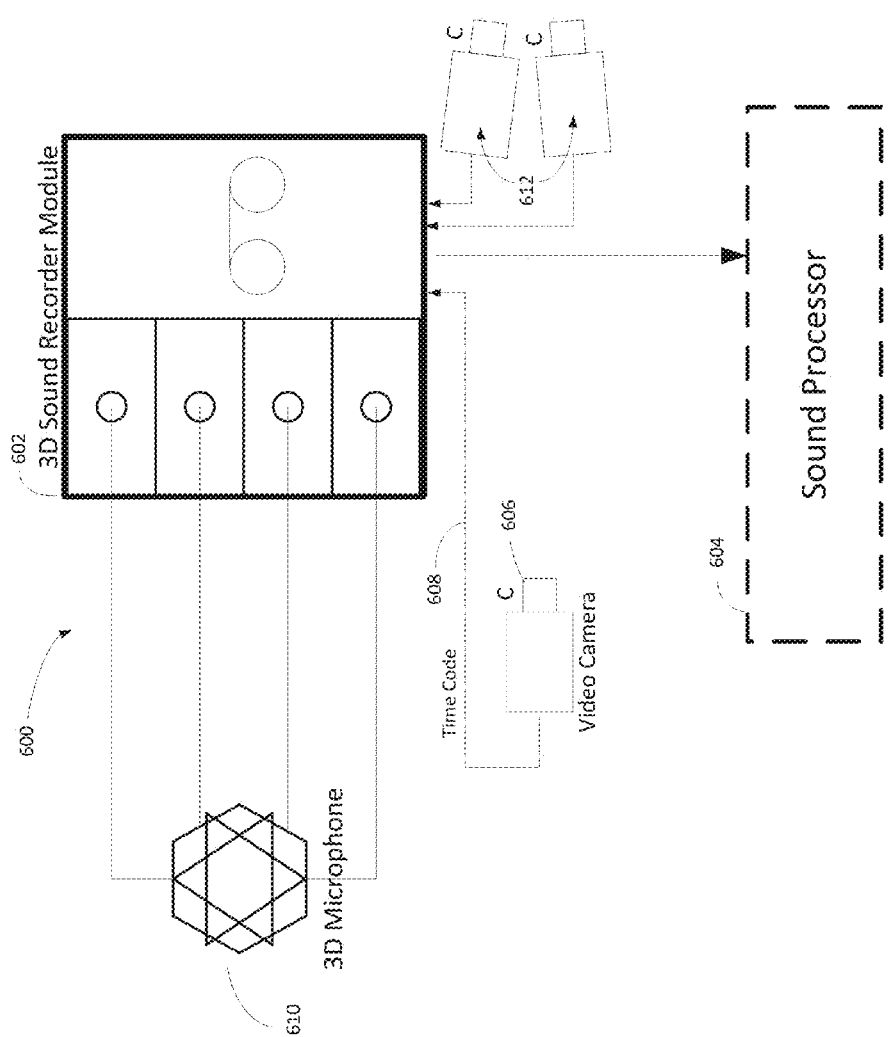
FIG. 6 illustrates a block diagram for an example 3D-EA system for recording 3D audio, in accordance with an example embodiment of the disclosure.

Turning to FIG. 6, in this figure, an example 3D-EA system 600 for recording or encoding 3-D audio information is shown, according to an embodiment of the disclosure. The system 600 may be utilized to record and/or otherwise encode 3-D audio information from the source environment. According to an example embodiment, the 3D-EA recording system 600 may encode the naturally occurring directional information within a particular scene or environment to help minimize the manual processing of 3D-EA sounds that may otherwise be done during post production. According to an example embodiment, the 3D-EA recording system 600 can record mono signals and assign a spatial data file (SDF), or multiple microphones can record on each respective channel according to placement. According to an example embodiment, a binaural microphone system (not shown) may be utilized for recording audio. A typical binaural recording unit has two high-fidelity microphones mounted in a dummy head, and the microphones are inserted into ear-shaped molds to fully capture some or all of the audio frequency adjustments that can occur naturally as sound wraps around the human head and is "shaped" by the form of the outer and inner ear. According to another example embodiment, a 3-D microphone 610, which may be similar to the calibration microphone 108 described in FIG. 1 above, may be utilized to selectively record sounds from multiple directions. According to an example embodiment, the 3-D microphone may have at least one diaphragm element per spatial dimension of directional sensitivity and encoding. The signals produced by the 3-D microphone 610 may be received and recorded via a 3-D sound recorder module 602 having multiple input and storage channels. According to an example embodiment of the disclosure, the 3-D sound recorder module 602 may simultaneously record time code 608 that is provided by a video camera 606. According to an example embodiment of the disclosure, the 3-D sound recorder module 602 may simultaneously record time code 608 that is provided by a time-code generator within the 3-D sound recorder module 602. After recording the audio and time code, the information may be downloaded or otherwise transferred to an online and/or off-line sound processor 604 for further processing or storage. According to example embodiments of the disclosure, the audio and time code information may be further edited and processed for use with a video, an audio recording, or a computer game, for example.

Figure 7:
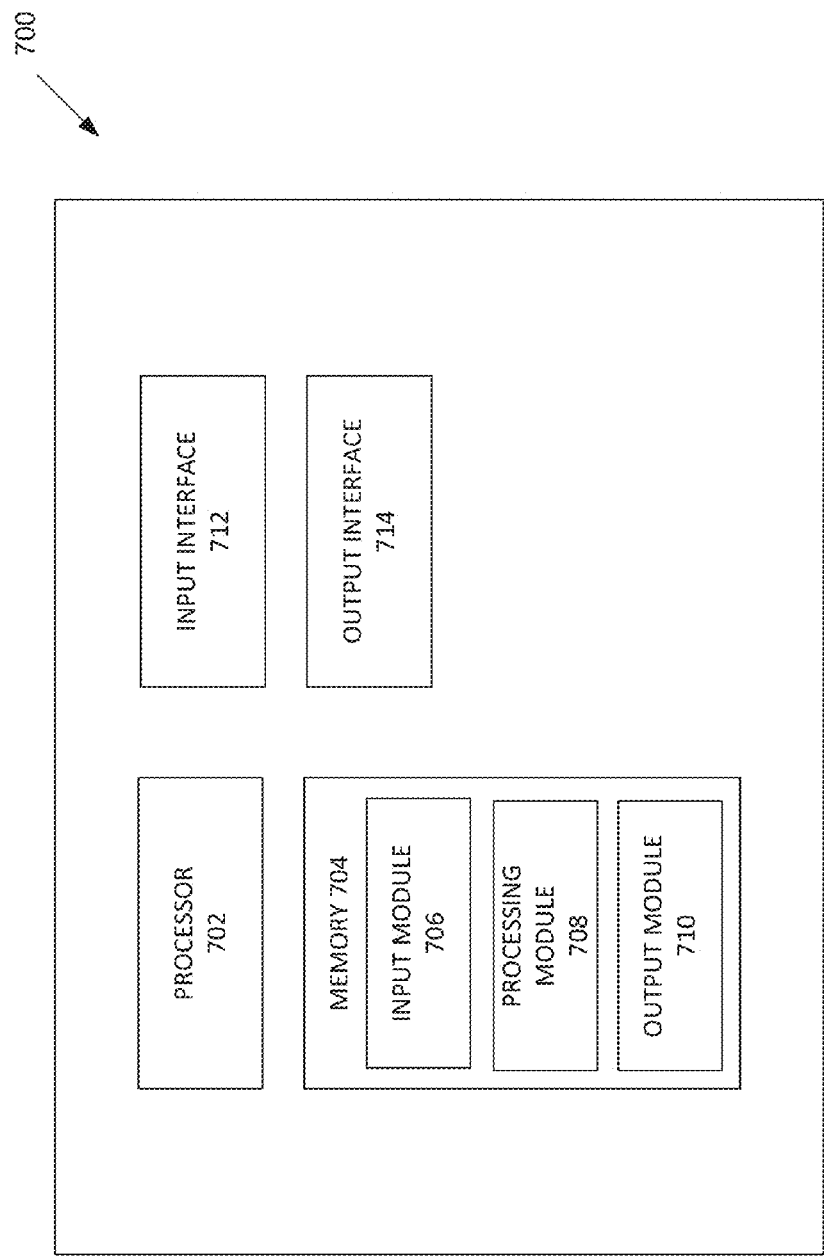
FIG. 7 illustrates an example controller interface component device for a 3D-EA system, according to an embodiment of the disclosure.
Figure 8:
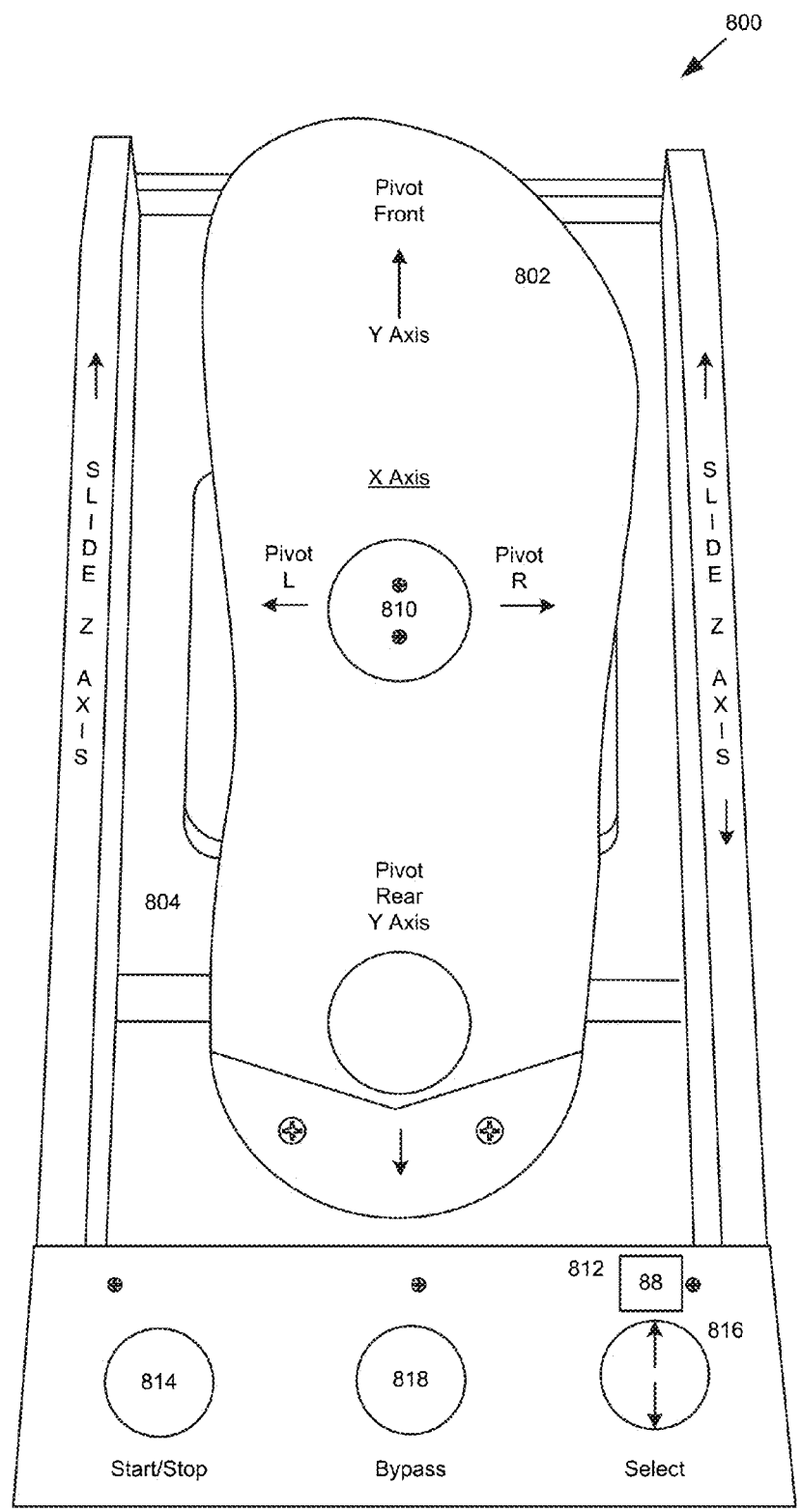
FIGS. 8-14 illustrate an example input control device, according to an embodiment of the disclosure.
Figure 9:
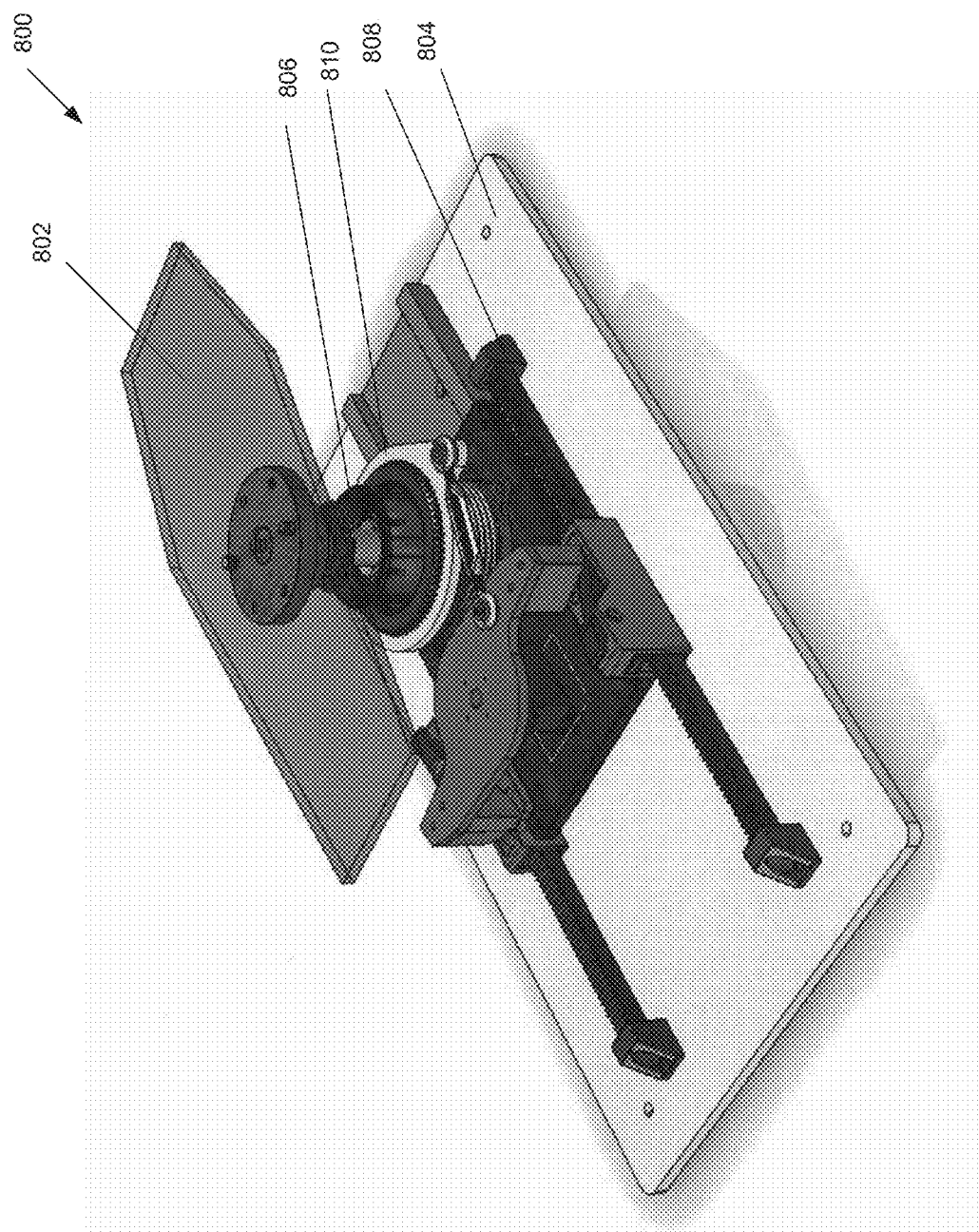
Figure 10:
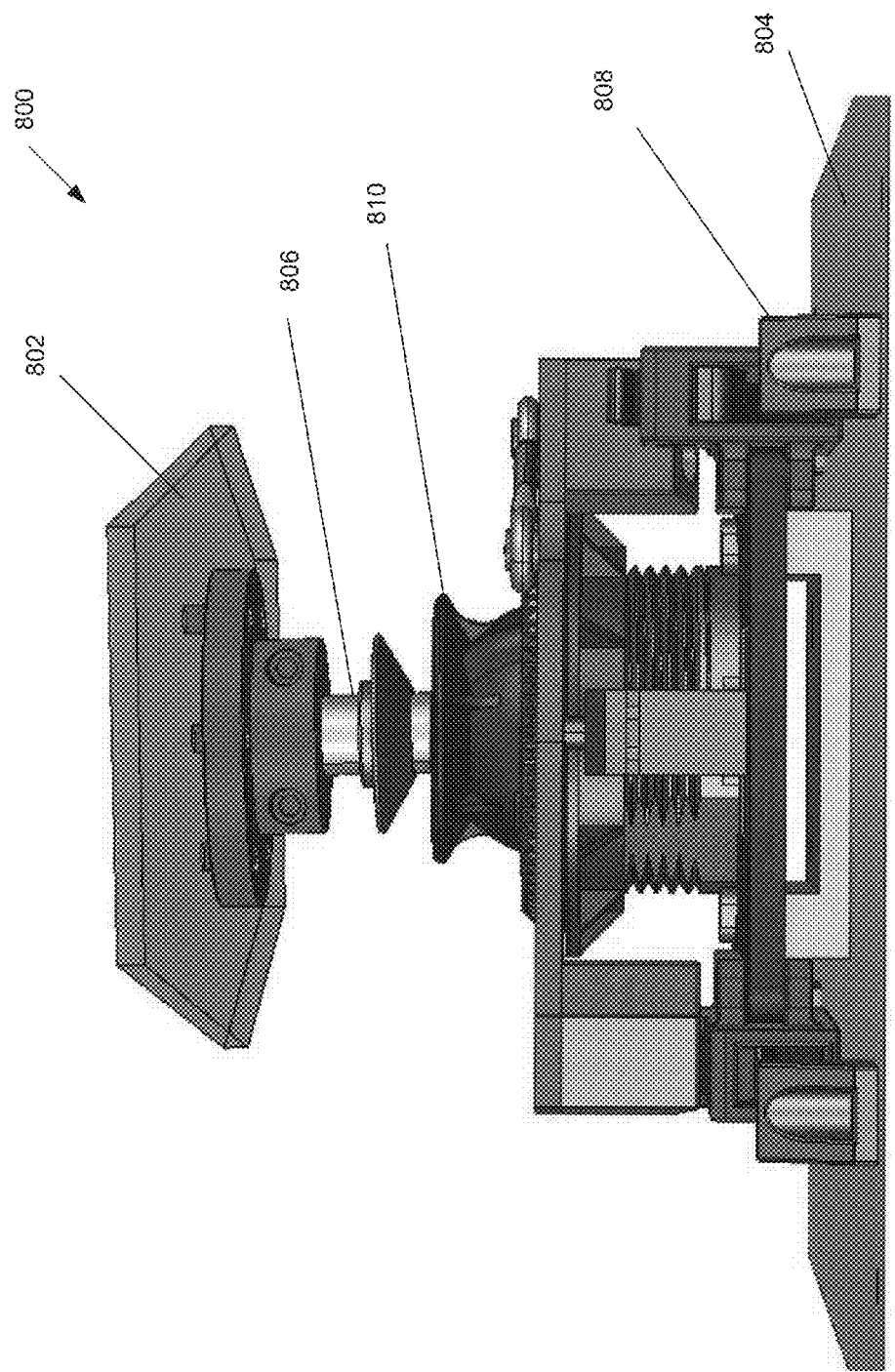
Figure 11:
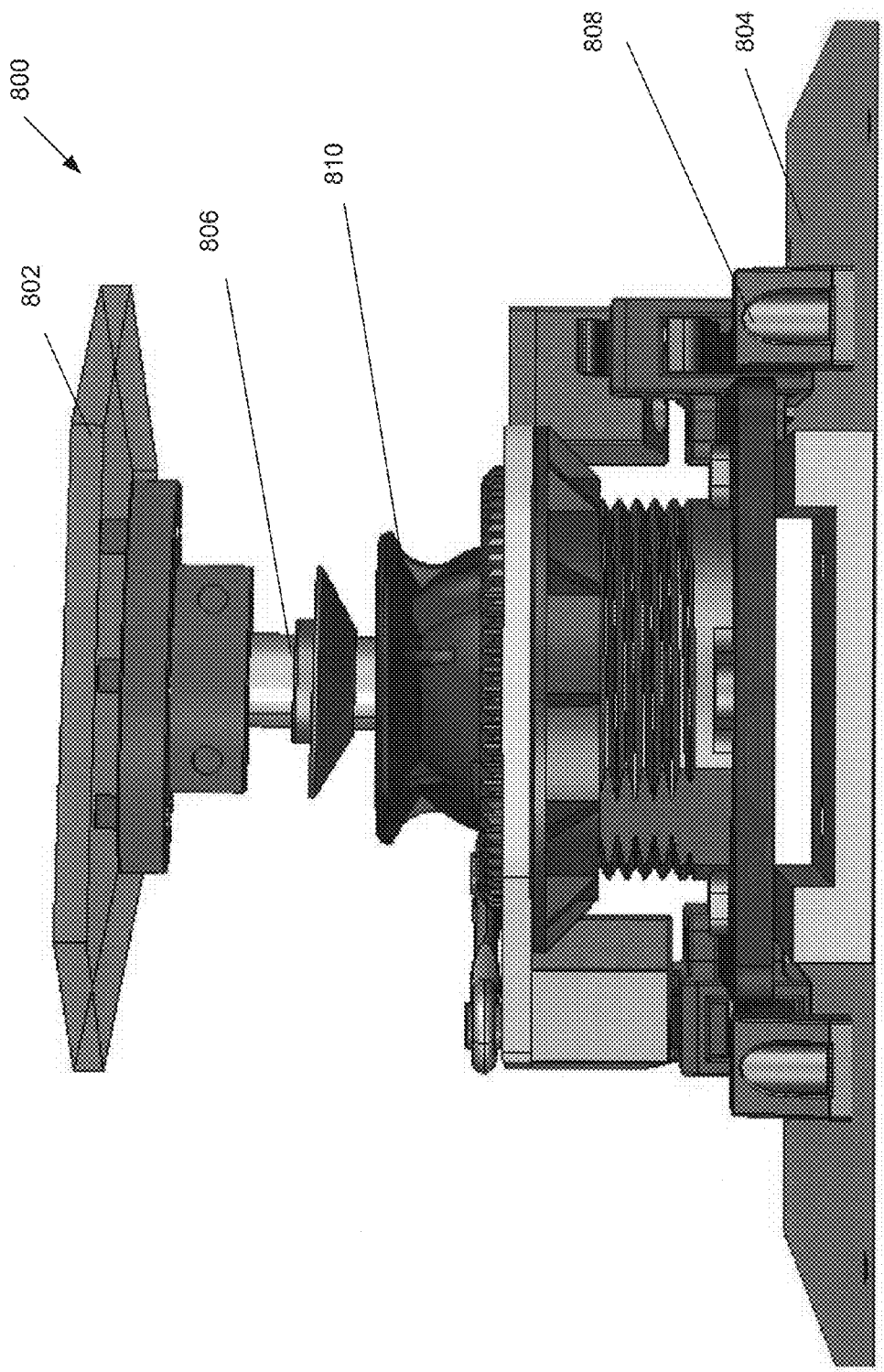
Figure 12:
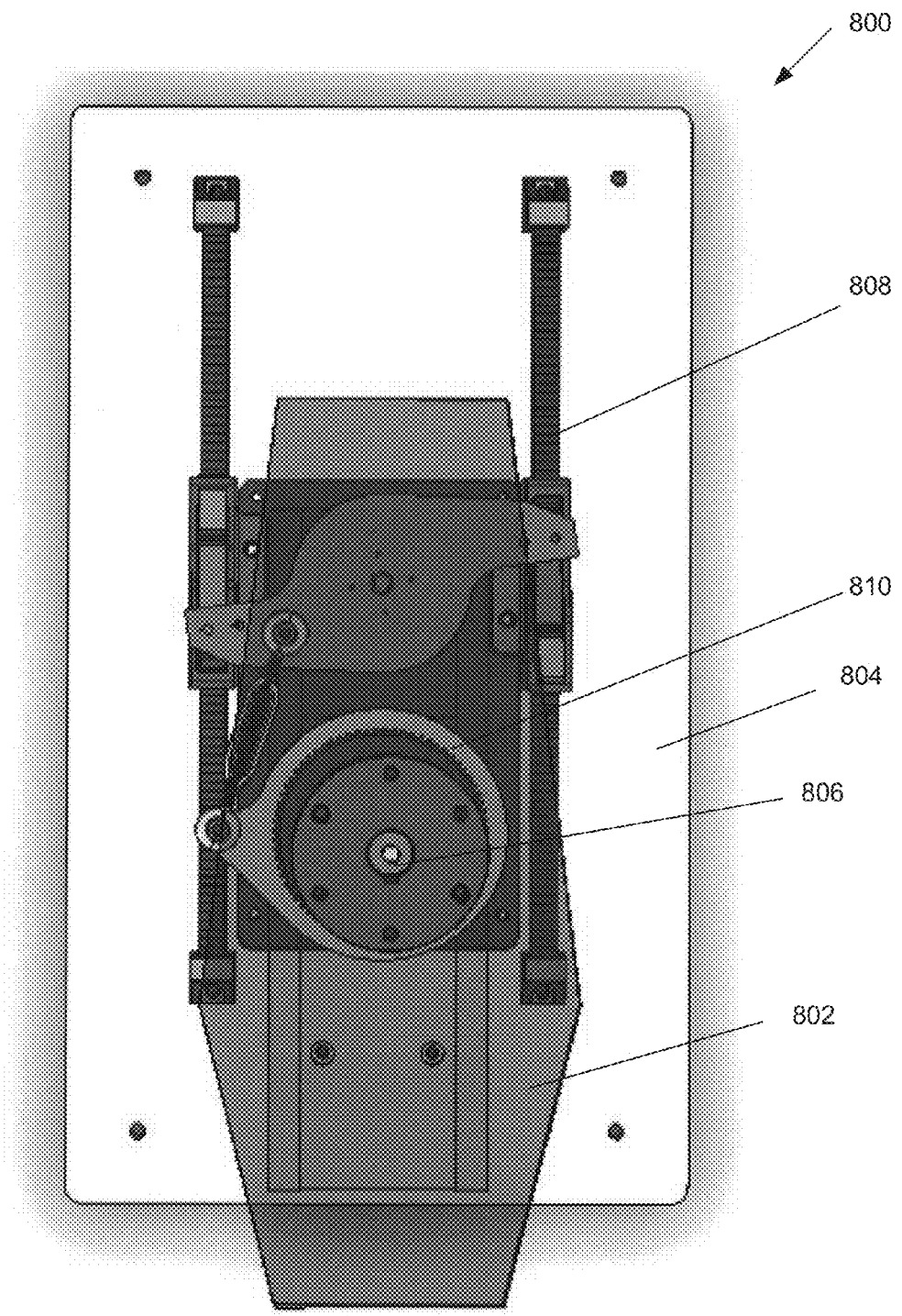
Figure 13:
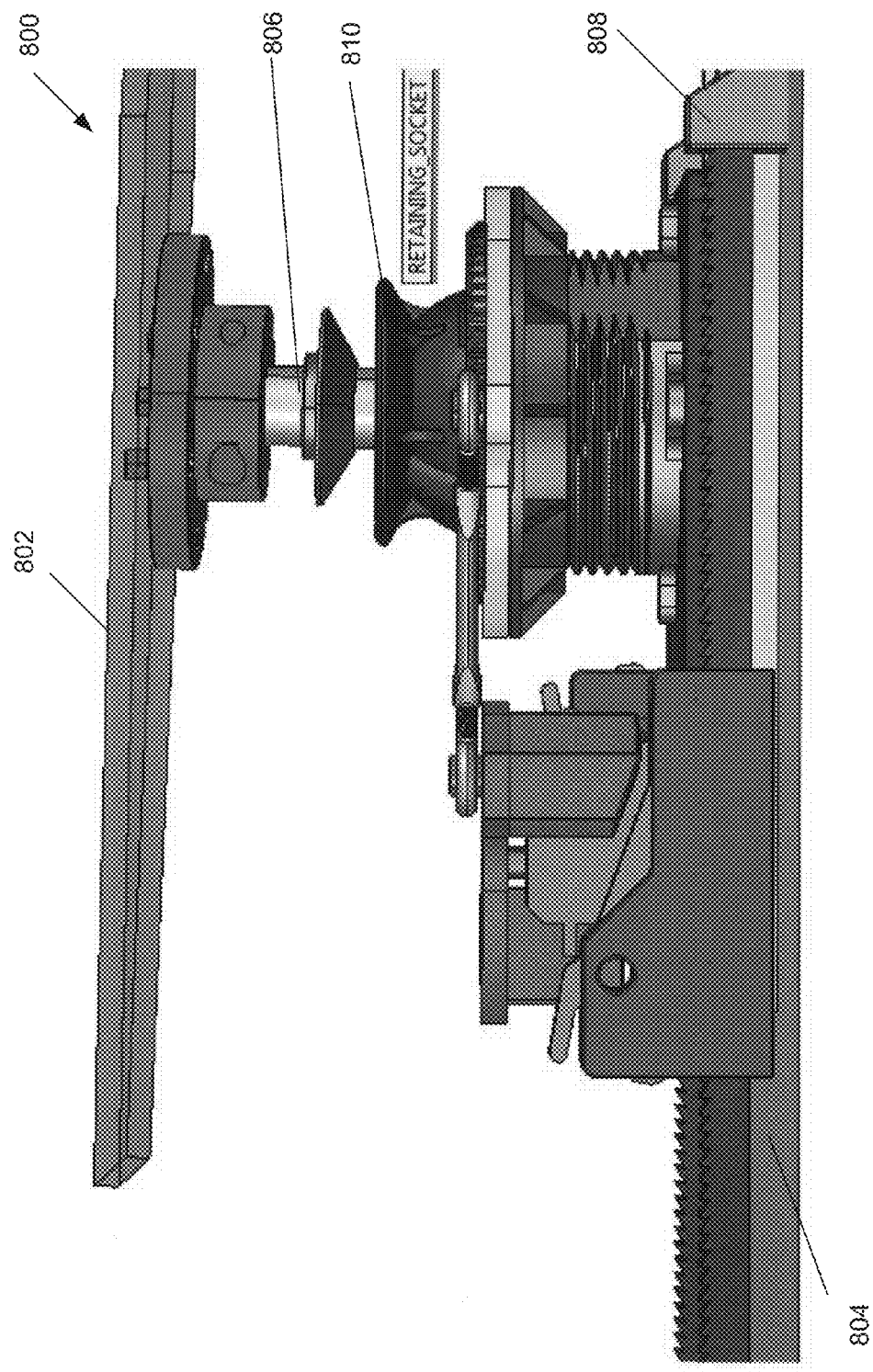
Figure 14:
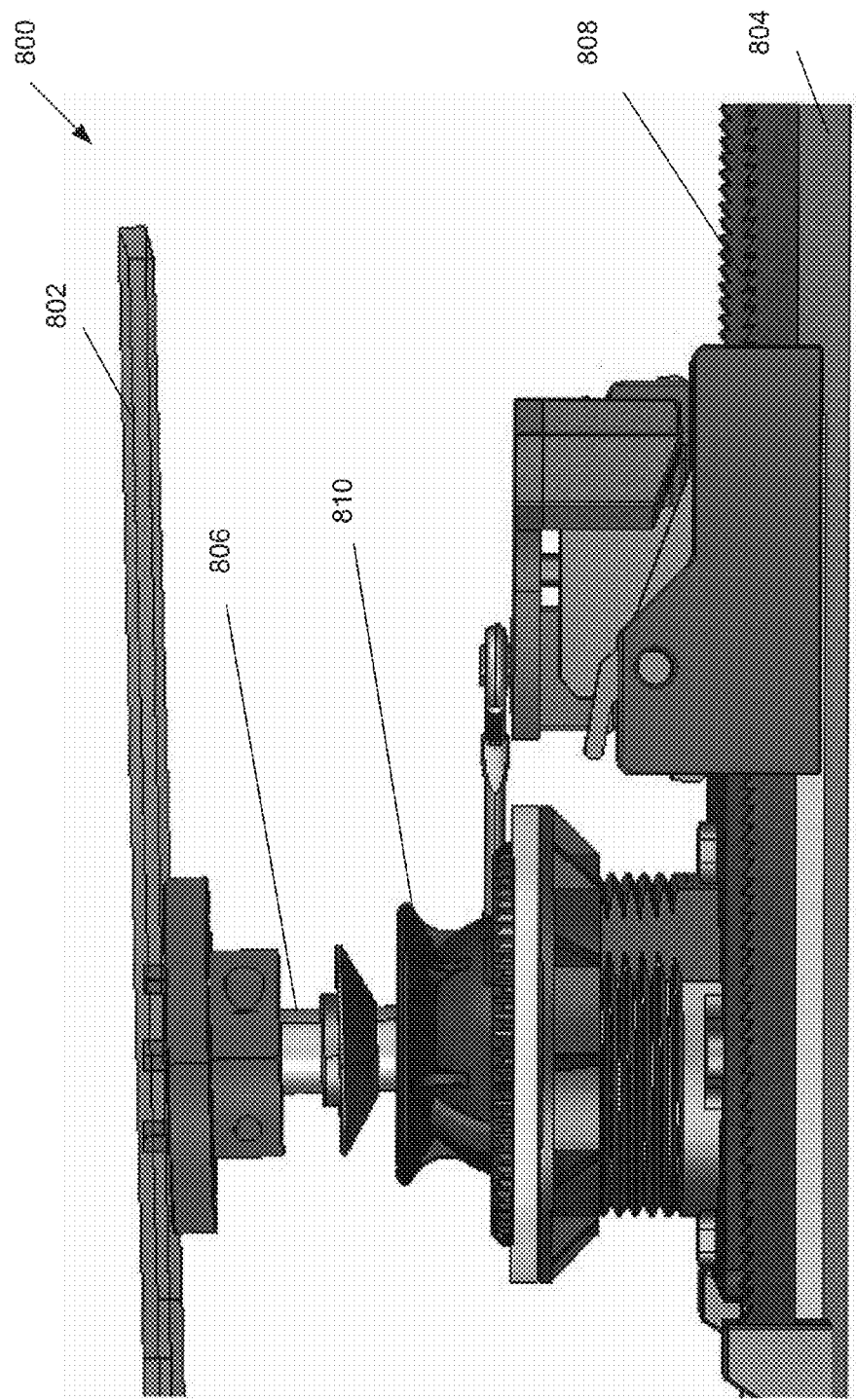

Turning to FIG. 7, an example controller interface component device 700 for use with a 3D-EA system, such as 300 in FIG. 3, is shown. In the example device 700 of FIG. 7, the device 700 can include a processor 702, a memory 704, one or more sets of computer-executable instructions or modules 706-710, an input interface 712, and an output interface 714. The processor 702 can be configured to access, execute, or otherwise read the computer-executable instructions or modules 706-710 stored in memory 704. The computer-executable instructions or modules 706-710 can be stored on a variety of computer-readable media including, but not limited to, non-transitory media such as random access memory (RAM), flash RAM, magnetic media, optical media, solid state media, and so forth.

The input module 706, similar to the 3-D sound recorder module 602 in FIG. 6, can include a set of computer-executable instructions operable to receive one or more audio signals from any number of audio or signal sources, such as from a 3-D microphone 610 in FIG. 6. In certain embodiments, the input module 706 can include a set of computer-executable instructions operable to receive one or more video signals, such as from a video camera, such as 606 in FIG. 6. In certain embodiments, the input module 706 can include a set of computer-executable instructions operable to receive time code, such as 608 in FIG. 6, associated with one or more video signals, such as from a video camera, for example, 606. In certain embodiments, the input module 706 can include a set of computer-executable instructions operable to receive sonic spatial data (SSD) corresponding to one or more user inputs, such as from a foot pedal input control device shown as 800 in FIGS. 8-14, or from one or more buttons or a touch screen display associated with the controller interface component device. In certain embodiments, the input module 706 can include a set of computer-executable instructions operable to one or more receive one or more predefined volume and/or delay inputs, which can either be previously stored in a data structure or table, such as 1600 in FIG. 16, or otherwise received via corresponding user inputs via one or more buttons or a touch screen display associated with a controller interface component device.

FIGS. 8-14 illustrate an example input control device 800 according to an embodiment of the disclosure. The input control device 800, or foot pedal input control device shown in FIGS. 8-14 can be used for capturing one or more user inputs in real time with respect to sonic spatial data (SSD) while mixing and/or recording music, such as during in-studio mixing, live performances, and recording of 3-D audio output signals. Thus, the input control device 800 of FIGS. 8-14 can facilitate direct sonic spatial data (SSD) control in real time. For example, user inputs received from the input control device 800 can simultaneously affect volume and delay values of a sonic spatial map (SSM), and provide relatively smooth transitions through volume and delay ranges. In certain instances, when increased pressure is applied by the user to the input control device 800, the speed of the transitions can be increased. In certain instances, the input control device 800 can be used to control dB shift versus a predefined delay range.

In one embodiment, the input control device of FIGS. 8-14 can be manipulated by a user by applying pressure to an associated foot pedal 802. The pedal pressure can affect the sound placement by manipulating the volume and delay. For example, when the foot pedal 802 is at a par or central position and no pressure is applied by the user to the foot pedal 802, no volume or delay input is made. That is, the relative lack of change in position of the foot pedal 802 does not generate any X, Y, or Z-axis changes which can be correlated to a change in volume and/or delay. In certain instances, when sounds are moving away from the listener, the volume decreases and delay increases. A user can manipulate the foot pedal 802 in specific X, Y, and/or Z-axis changes to correlate with suitable changes in volume and/or delay to affect the sound placement. Likewise, in certain instances, when sounds are moving towards the listener, the volume increases and the delay is non-existent. Again, a user can manipulate the foot pedal 802 in specific X, Y, and/or Z-axis changes to correlate with suitable changes in volume and/or delay to affect the sound placement.

As shown in FIGS. 8-14, the input control device 800 can include a foot pedal 802 pivotably mounted to a support base 804. The foot pedal 802 may be a relatively lightweight alloy footplate. In certain embodiments, the foot pedal 802 may be contoured to generally fit the shape of a user's foot or other appendage. The input control device 800 shown can be operable to input at least one user command with respect to controlling or otherwise modifying 3-D audio output signals. The input control device 800 can implement X-axis controls by pivoting the foot pedal 802 to the left and/or to the right with respect to a vertical axis bisecting the foot pedal 802. The input control device 800 can implement Y-axis controls by pivoting the foot pedal 802 forward and/or rearward with respect to a horizontal axis bisecting the pedal. Thus, in the embodiment shown, the foot pedal 802 can mount to a X-Y axis joystick-type device 806. The input control device 800 can implement Z-axis controls by sliding the foot pedal 802 forward and/or rearward with respect to the support base 804. Thus, the foot pedal 802 can also mount to a Z-axis sliding base device 808. A locking device 810, which can be activated by a user depressing the central portion of the foot pedal 802, can permit the pedal 802 to either slide or remain relatively stationary with respect to the support base 804. That is, when the locking device 810 is activated, the position of the foot pedal 802 can be held in a relatively stationary position with respect to the support base 804. Thus, the support base 804 can be a relatively heavier device for supporting the foot pedal 802, X-Y axis joystick-type device 806, and Z-axis sliding base device 808. At a portion of the support base 804, away from the foot pedal 802, additional user controls can be provided. The additional user controls can include, for example, a display device 812, a start/stop switch 814, a millisecond delay and/or decibel unit counter or selector 816, and a bypass switch 818.

In the embodiment shown in FIGS. 8-14, the display device 812 can output one or more current settings of the input control device 800. For example, the current settings can include, but are not limited to, a preset channel, a locked/unlocked indicator, a time code counter, and a bypass (mute) indicator.

The input control device 800 shown can be operable to be manipulated with a user's foot, but other embodiments could be manipulated by a user's hand, other body part, voice, light, or other command or gesture provided by a user. For example, the input control device 800 can be manipulated by a user using his or her foot when the user's hands are being occupied by a music instrument. In use, as the user is playing and recording music, the user can simultaneously manipulate the input control device 800 with his or her foot to capture sonic spatial data (SSD), which is affected by the user's manipulation of the input control device 800. When the user does not apply any pressure to the foot pedal 802, the pedal 802 can return to a par or central position. Thus, the input control device 800 can output user inputted data including X-, Y-, and/or Z-axis data.

The input control device 800 shown in FIGS. 8-14 can, in some instances, be powered by a conventional battery, such as one or more lithium-type or rechargeable batteries, or may be connected to a direct or alternating current source.

Furthermore, the input control device 800 shown in FIGS. 8-14 can be in communication with an associated interface controller unit and/or an audio sound system, such as a 3D-EA system, similar to 100 in FIG. 1, or a 3D-EA playback component device, by way of direct connection, wireless, Bluetooth, radio frequency, network, Internet, or other conventional mode of communication.

One will recognize, according to embodiments of the disclosure, the applicability of the features and aspects of the input control device 800 to other types or configurations of control devices, such as a joystick, trackball, a manually-operated device, light interface, and gesture control-type devices.

Figure 15:
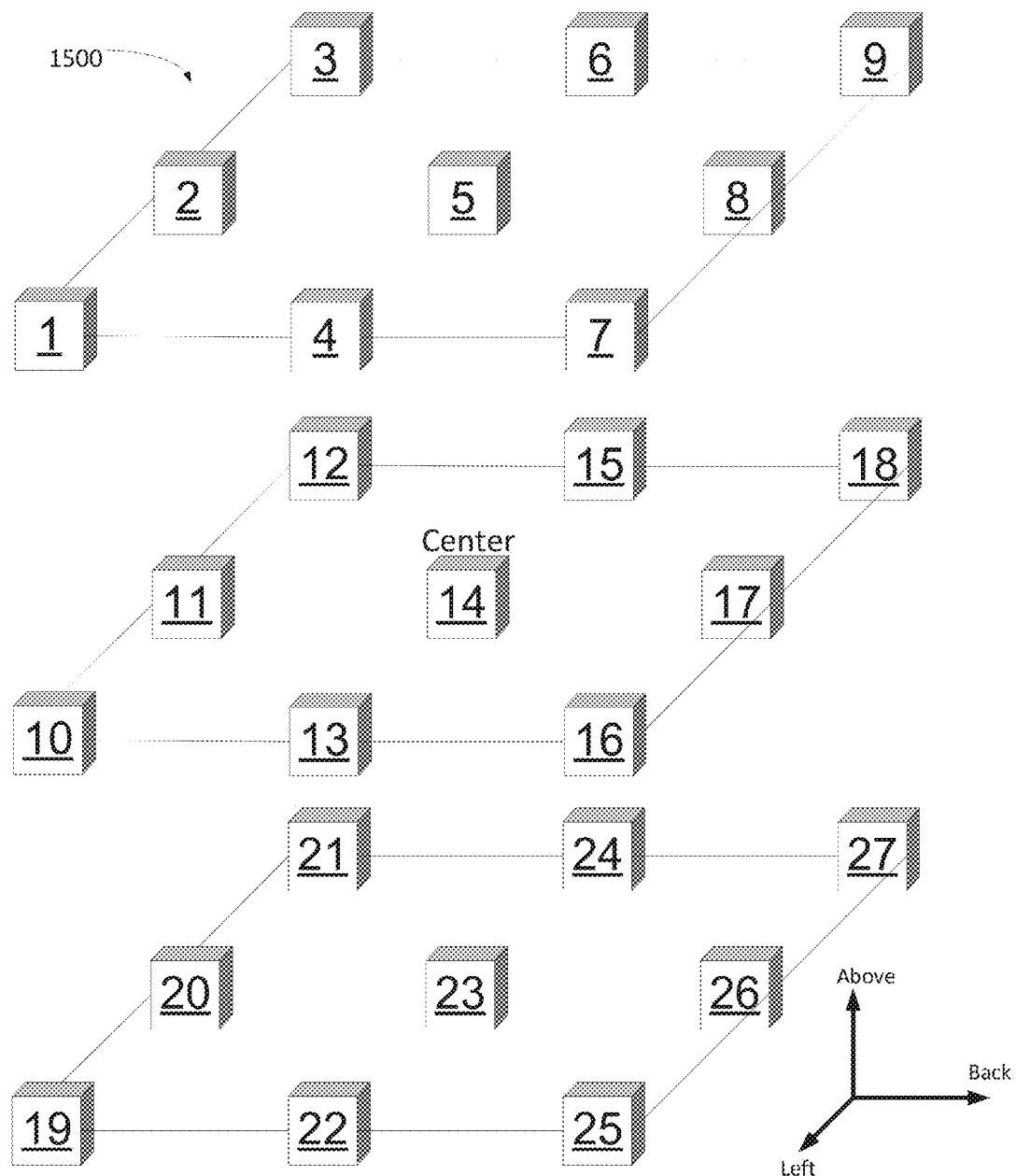
FIG. 15 illustrates an example 3D-EA sound localization map, according to an example embodiment of the disclosure.

FIG. 15 depicts a 3D-EA sound localization map 1500, according to an example embodiment of the disclosure. The 3D-EA sound localization map 1500 may serve as an aid for describing, in space, the relative placement of the 3D-EA sound localizations relative to a central location. According to an example embodiment, the 3D-EA sound localization map 1500 may include three vertical levels, each with 9 sub-regions, for a total of 27 sub-regions placed in three dimensions around the center sub-region 14. The top level may consist of sub-regions 1-9; the middle level may consist of sub-regions 10-18; and the bottom level may consist of sub-regions 19-27. An example orientation of a listening environment may place the center sub-region 14 at the head of the listener. The listener may face forward to look directly at the front center sub-region 11. According to other embodiments, the 3D-EA sound localization map 1500 may include more or less sub-regions, but for the purposes of defining general directions, vectors, localization, etc. of the sonic information, the 3D-EA sound localization map 1500 may provide a convenient 3-D framework for the disclosure. As discussed in the preceding paragraphs, and in particular, with respect to FIG. 1, one aspect of the 3-D audio converter/amplifier 102 is to adjust, in real or near-real time, the parameters of the multiple audio channels so that all or part of the 3D-EA sound is dynamically localized to a particular region in three dimensional space. According to other example embodiments, the 3D-EA sound localization map 1500 may include more or less sub-regions. According to another example embodiment, the 3D-EA sound localization map 1500 may have a center offset vertically with respect to the center region shown in FIG. 4. The 3D-EA sound localization map 1500 may be further explained and defined in terms of audio levels sent each speaker to localize 3D-EA sound at any one of the sub-regions 1-27 with the aid of FIG. 16.

According to an example embodiment of the disclosure, FIG. 16 depicts an example look-up table 1600 of relative sound volume levels (in decibels) that may be set for localizing the 3D-EA sound near any of the 27 sub-regions. The symbols "+", "−", "0", and "off" represent the relative signal levels for each speaker that will localize the 3D-EA sound to one of the 27 sub-regions, as shown in FIG. 15. According to an example embodiment of the disclosure, the "0" symbol may represent the default level for a particular speaker's volume, which may vary from speaker to speaker. According to an example embodiment of the disclosure, the "+" symbol may represent +6 dB, or approximately a doubling of the volume with respect to the default "0" signal level. The "−" symbol may represent about −6 dB, or approximately one half of the volume with respect to the default "0" level of the signal. The symbol "off" indicates that there should be no signal going to that particular speaker. In other example embodiments, the "+" symbol may represent a range of levels from approximately +1 to approximately +20 dB, depending on factors such as the size of the 3D-EA listening sphere or dome 512 needed in order to reproduce 3D-EA sounds for one or more listeners. Likewise, the "−" symbol may represent a range of levels from approximately −1 to approximately −20 dB. According to an example embodiment of the disclosure, the size of the 3D-EA listening sphere or dome 512 in FIG. 4 may be expanded or compressed by value of the signal level assigned to the "+" and "−" symbols.

In certain embodiments, if a 20 dB range is used, the starting point can be −10 dB when the value is 0 on the sonic spatial map (SSM).

In accordance with example embodiments of the disclosure, signals may be adjusted to control the apparent localization of sounds in a 3-dimensional listening environment. In an example embodiment, audio signals may be selectively processed by adjusting one or more of delay, and/or volume. In an example embodiment the audio signals may be selectively processed based on receiving decode data associated with the one or more audio channels. In accordance with an example embodiment, the decode data may include routing data for directing specific sounds to specific speakers, or to move sounds from one speaker (or set of speakers) to another to emulate movement. According to example embodiments, routing the one or more audio channels to one or more speakers may be based at least in part on the routing data. In certain embodiments, routing may include amplifying, duplicating and/or splitting one or more audio channels. In an example embodiment, routing may include directing the one or more audio channels to six or more processing channels.

Example Methods of Simulating 3D Audio Sound

Figure 17:
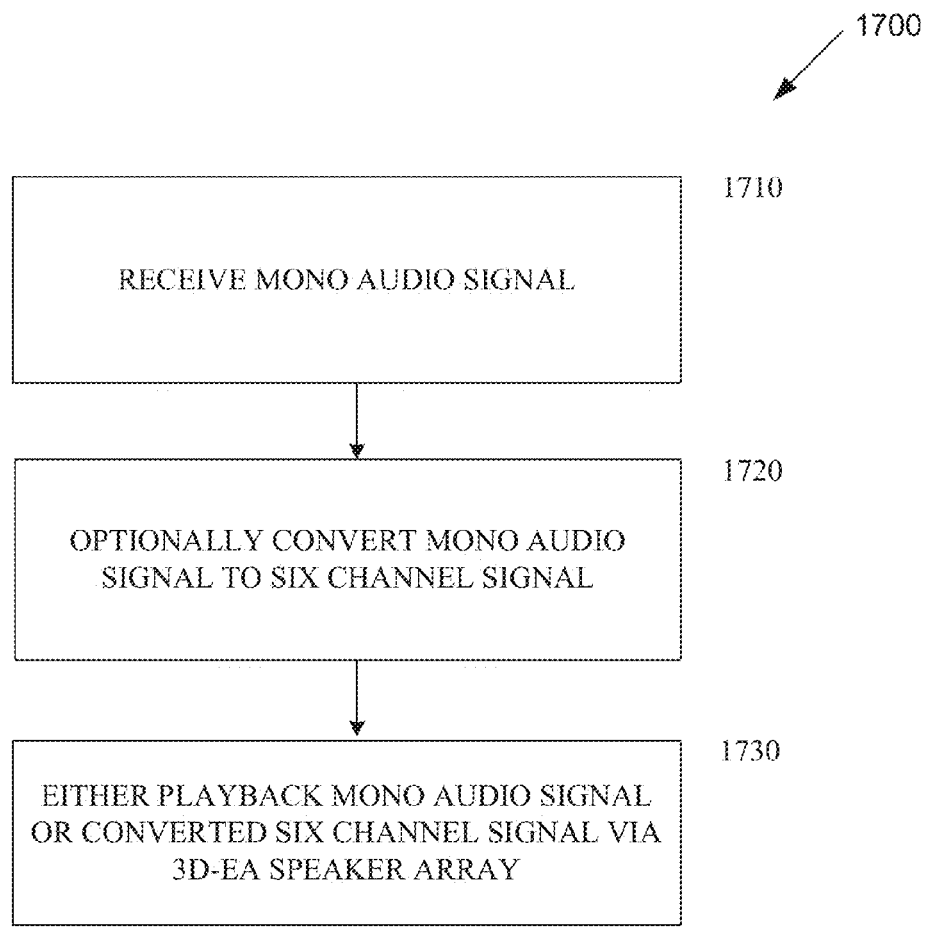
FIGS. 17-26 illustrate example methods associated with an example 3D-EA system, according to embodiments of the disclosure.

FIG. 17 illustrates a process for simulating three-dimensional audio sound according to an embodiment of the disclosure. In block 1710, a mono audio signal can be received. Block 1710 is followed by optional block 1720, in which the mono audio signal is converted to a six channel signal. Block 1720 is followed by block 1730, in which either playback of the mono audio signal or playback of the six channel signal is facilitated over a 3D-EA speaker array. In certain embodiments, the processing and playback of the mono audio signal can be known as a 3D-EA simulation. In certain embodiments, the conversion and playback of the six channel audio signal can be known as a 3D-EA pure play. The method can end after block 1730.

Example Methods of Recording 3D-Ea Audio

Figure 18:
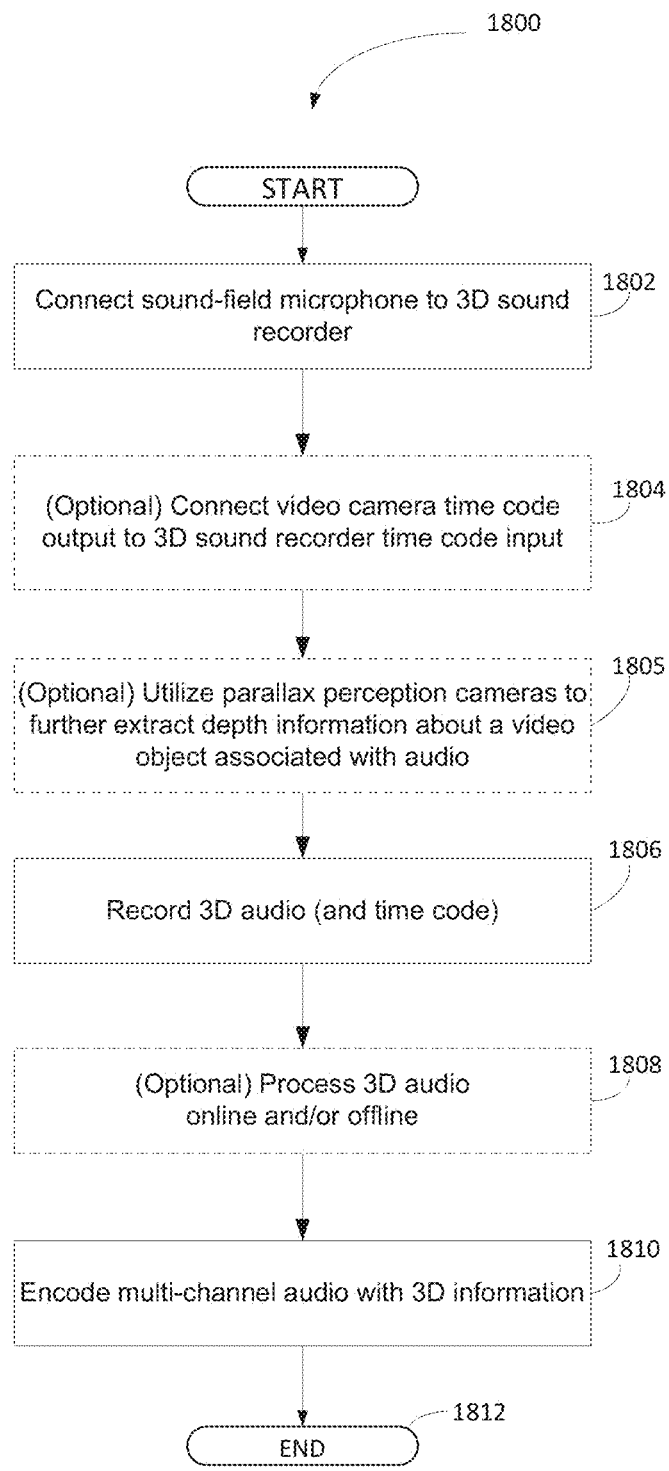

Methods for recording 3-D audio, according to an example embodiment of the disclosure, will now be described with respect to FIG. 6 and the flowcharts of FIGS. 18 and 20. In FIG. 18, a first example method 1800 begins in block 1802 where a 3-D microphone 610 is connected to a 3-D sound recorder 602. The 3-D microphone 610 may have multiple diaphragms or elements, each with a directional sensitivity that may selectively detect sonic information from a particular direction, depending on the orientation of the element. The directional receiving elements or diaphragms may comprise condenser elements, dynamic elements, crystal elements, piezoelectric elements, or the like. The diaphragms may have a cardioid, or super-cardioid sensitivity patterns, and may be oriented with respect to their nearest neighbors for partial overlap of their acceptance or sensitivity patterns. The 3-D microphone 610 may have 3 or more diaphragms for partial 3-D or whole sphere coverage. The 3-D microphone 610 may have an indicator or marking for proper directional orientation within a particular space.

Method 1800 continues in optional block 1804 where time code 608 from a video camera 606 (or other time code generating equipment) may be input to the 3-D sound recorder 602, recorded in a separate channel, and used for playback synchronization at a later time. Optionally, the 3-D sound recorder 602 may include an internal time code generator (not shown).

Method 1800 continues in optional block 1805 where parallax information from a stereo camera system 612 may be utilized for detecting the depth information of an object. The parallax information associated with the object may further be utilized for encoding the relative sonic spatial position, direction, and/or movement of the audio associated with the object.

The method continues in block 1806 where the 3-D audio information (and the time code) may be recorded in a multi-channel 3-D sound recorder 602. The multi-channel 3-D sound recorder 602 may include microphone pre-amps, automatic gain control (AGC), analog-to-digital converters, and digital storage, such as a hard drive or flash memory. The automatic gain control may be a linked AGC where the gain and attenuation of all channels can be adjusted based upon input from one of the microphone diaphragms. This type of linked AGC, or LAGC, may preserve the sonic spatial information, limit the loudest sounds to within the dynamic range of the recorder, and boost quiet sounds that may otherwise be inaudible.

Method 1800 continues in block 1808 with the processing of the recorded 3-D audio information. The processing of the 3-D audio information may be handled on-line, or optionally be transferred to an external computer or sound processor 604 for off-line processing. According to an example embodiment of the disclosure, the processing of the 3-D audio information may include analysis of the audio signal to extract the directional information. As an illustrative example, suppose 3-D recorder is being used to record a scene of two people talking next to road, with the microphone positioned between the road and the people. Presumably, all of the microphone channels will pick up the conversation, however the channels associated with the diaphragms closest to the people talking will likely have larger amplitude signal levels, and as such, may provide directional information for the conversation relative to the position of the microphone. Now, assume that a car travels down the street. As the car travels, the sound may be predominant in one channel associated with the microphone diaphragm pointed towards the car, but the predominant signal may move from channel to channel, again providing directional information for the position of the car with respect to time. According to an example embodiment of the disclosure, the multiple-diaphragm information, as described above, may be used to encode directional information in the multi-channel audio. Method 1800 can end after block 1810 at block 1812, where the processed 3-D information may be encoded into the multiple audio channels.

Another method for recording multi-dimensional audio is discussed with reference to certain figures below. According to one example embodiment of the disclosure, the signals recorded using the 3-D microphone may be of sufficient quality, with adequate natural directionality that no further processing is required. However, according to another example embodiment, the 3-D microphone may have more or fewer diaphragms than the number of speakers in the intended playback system, and therefore, the audio channels may be mapped to channels corresponding with the intended speaker layout. Furthermore, in situations requiring conventional recording techniques using high quality specialized microphones, the 3-D microphone may be utilized primarily for extracting 3D-EA sonic directional information. Such information may be used to encode directional information onto other channels that may have been recorded without the 3-D microphone. In some situations, the processing of the 3-D sound information may warrant manual input when sonic directionality cannot be determined by the 3-D microphone signals alone. Other situations are envisioned where it is desirable to encode directional information into the multi-channel audio based on relative position of an object or person within a video frame. Therefore, the method of processing and encoding includes provisions for manual or automatic processing of the multi-channel audio.

According to certain embodiments of the disclosure, sounds emanating from different directions in a recording environment may be captured and recorded using a 3-D microphone having multiple receiving elements, where each receiving element may be oriented to preferentially capture sound coming predominately from a certain direction relative to the orientation of the 3-D microphone. According to example embodiments, the 3-D microphone may include three or more directional receiving elements, and each of the elements may be oriented to receive sound coming from a predetermined spatial direction. In accordance with embodiments of the disclosure, sounds selectively received buy the directions receiving elements may be recorded in separate recording channels of a 3-D sound recorder.

According to an example embodiment, the 3-D recorder may record time code in at least one channel. In one embodiment, the time code may include SMTPE, or other industry standard formats. In another embodiment, the time code may include relative time stamp information that can allow synchronization with other devices. According to an example embodiment, time code may be recorded in at least one channel of the 3-D recorder, and the time code may be associated with at least one video camera.

According to example embodiments of the disclosure, the channels recorded by the 3-D recorder may be mapped or directed to output paths corresponding to a predetermined speaker layout, such as 6.0 or 6.1. In certain embodiments, the recorded channels may be mapped or directed to output paths corresponding to six speakers. In certain example embodiments, recorded channels may be directed to output channels that correspond to relative position of an object within a video frame.

Example Methods of Calibrating a 3D-EA System

Figure 19:
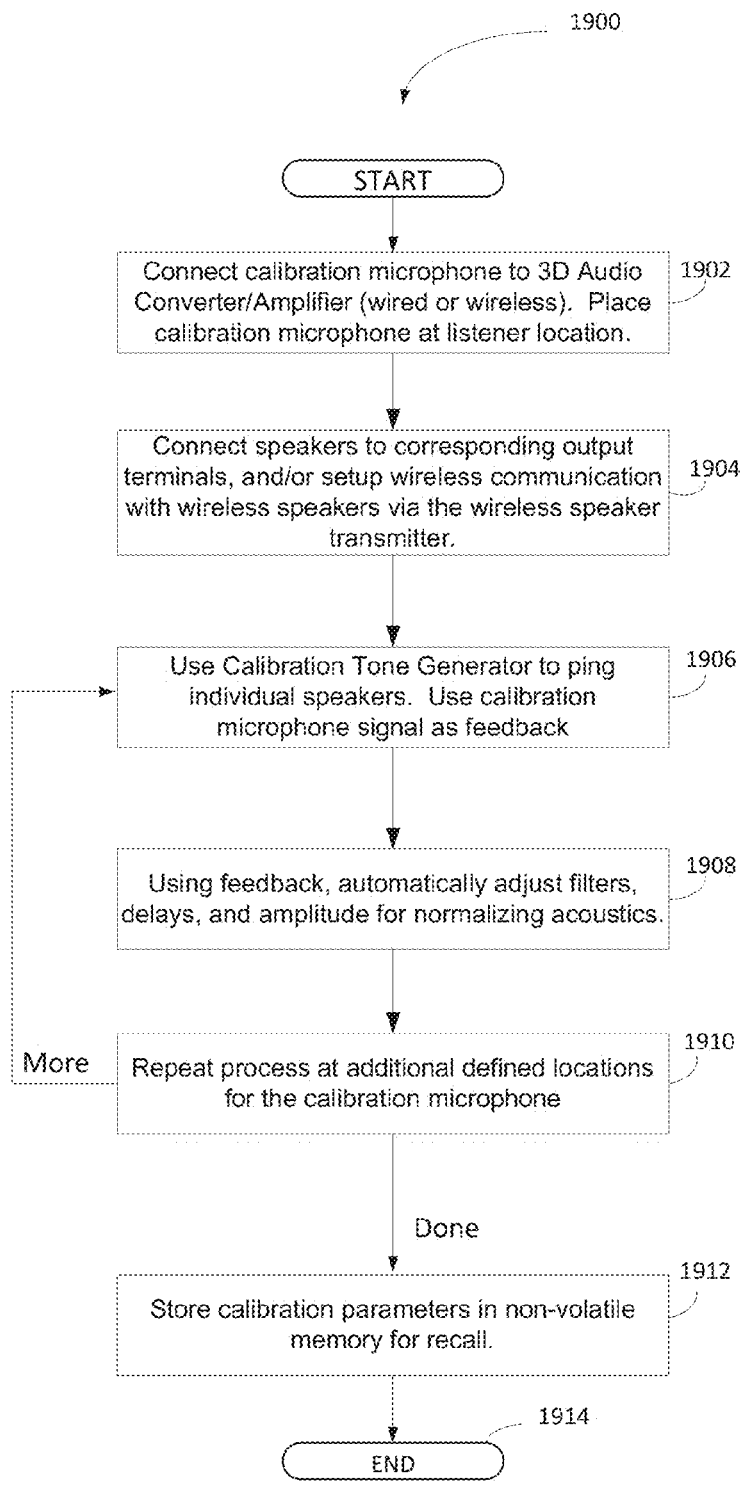

FIG. 19 depicts a method 1900 for setting-up and calibrating a 3-D audio system 100, according to an example embodiment of the disclosure. Beginning at block 1902, the calibration microphone 108 may be connected to the 3-D audio converter/amplifier, either wirelessly, or wired. According to an example embodiment of the disclosure, the calibration microphone 108 may include one or more directionally sensitive diaphragms, and as such, may be similar or identical to the 3-D microphone 108, 610 described above. In certain embodiments, a single omni-directional microphone can be employed. The method continues in block 1904 where the speakers 110-120 are connected to corresponding output terminals 232. Optionally, if one or more of the speakers are wireless, they can be in communication with the transmitter 250 for the wireless speakers. The setup mode of the 3-D audio converter/amplifier power may be entered manually, or automatically based upon the presence of the calibration microphone. The setup/calibration method continues in block 1906 where, according to an example embodiment of the disclosure, the calibration microphone may measure the relative phase and amplitude of special tones generated by the calibration tone generator 240 within the 3-D audio converter amplifier and output through the speakers 110-120. The tones produced by the calibration tone generator 240 may include impulses, chirps, white noise, pink noise, tone warbling, modulated tones, phase shifted tones, and multiple tones, and may be generated in an automatic program where audible prompts may be given instructing the user to adjust the speaker placement or calibration microphone placement.

Method 1900 continues in block 1908 where according to an example embodiment of the disclosure, signals measured by the calibration microphone 108, 610 may be used as feedback for setting the parameters of the system 100 or apparatus 300, including filtering, delay, amplitude, and routing, etc. for normalizing the room and speaker acoustics. The method continues at block 1910 where the calibration process can be looped back to block 1906 to setup additional parameters, remaining speakers, or placement of the calibration microphones 108, 610. Looping through the calibration procedure may be accompanied by audible or visible prompts, for example "Move the calibration microphone approximately 2 feet to the left, then press enter." so that the system can properly setup the 3D-EA listening sphere or dome 512. Otherwise, if all of the calibration procedure has completed, the method may continue to block 1912 where the various calibration parameters calculated during the calibration process may be stored in non-volatile memory 252 for automatic recall and setup each time the system is subsequently powered-on so that calibration is necessary only when the system is first setup in a room, or when the user desires to modify the diameter of the 3D-EA listening sphere or dome 512, or when other specialized parameters are setup in accordance with other embodiments of the disclosure. The method 1900 can end after block 1914.

An additional method for initializing and/or calibrating speakers associated with the 3D-EA system will be further described below.

Figure 20:
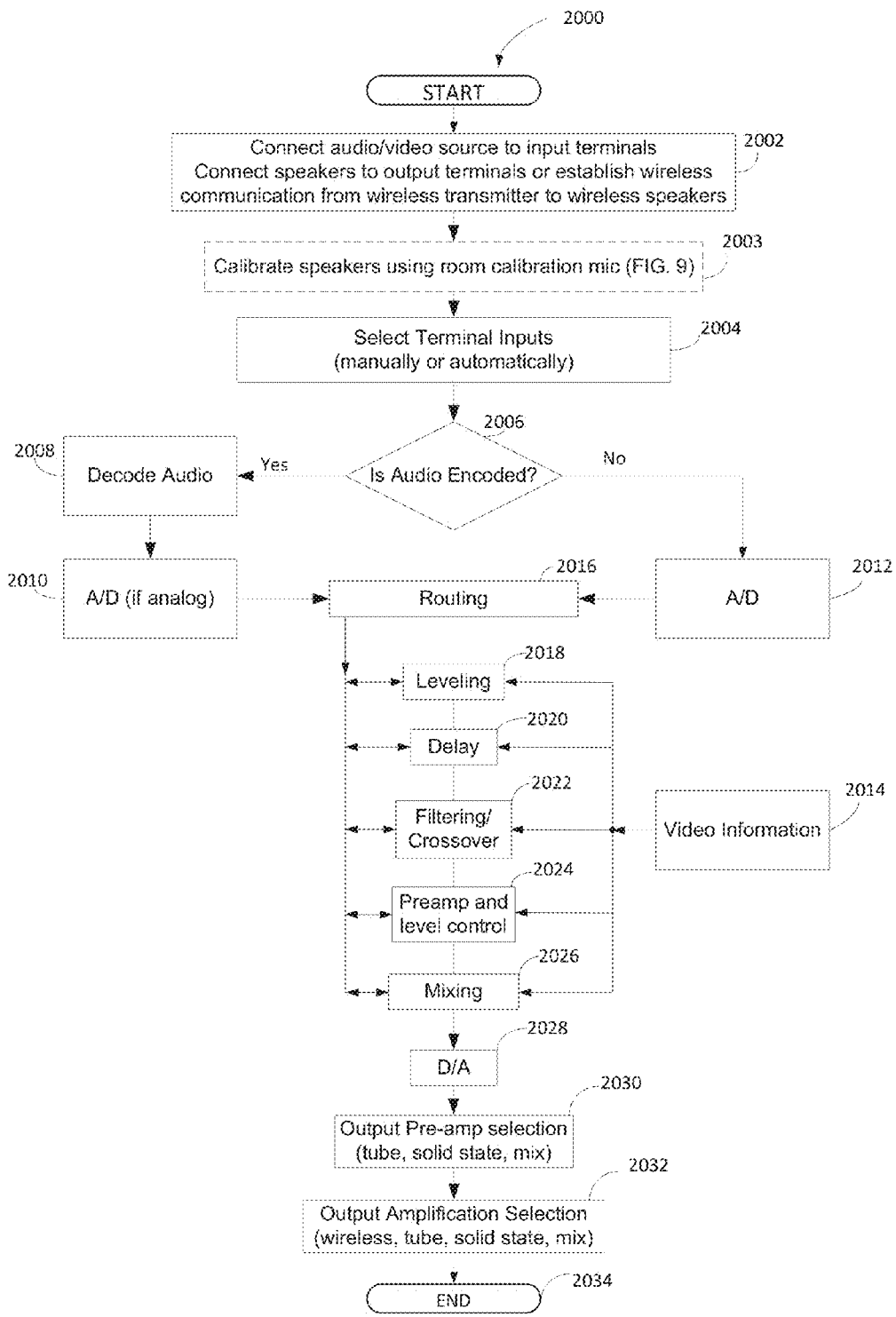

According to an example embodiment of the disclosure, a method 2000 is shown in FIG. 20 for utilizing the 3-D audio converter/amplifier for playback. Starting at block 2002, the input devices (audio source, video source) may be hooked to the input terminals of the 3-D audio converter/amplifier 102. Next, in block 2003, the system can be optionally calibrated, as was described above with reference to the flowchart of FIG. 19. For example, if the system was previously calibrated for the room, then the various pre-calculated parameters may be read from non-volatile memory 252, and calibration may not be necessary. The method 2000 continues in block 2004 where the input terminals are selected, either manually or automatically, by detecting the input on terminals. The method 2000 may then continue to decision block 2006 where a determination can be made as to the decoding of the audio. If the terminal select decoder A/D 214 module detects that the selected input audio is encoded, it may decode the audio, as indicated in block 2008. According to an example embodiment, the decoding in block 2008 may, for example, involve splitting a serial data stream into several parallel channels for separate routing and processing. After decoding, the terminal select decoder A/D 214 module may also be used to convert analog signals to digital signals in block 2010, however this A/D block may be bypassed if the decoded signals are already in digital format. If, in decision block 2006, the audio is determined to be generic analog stereo audio with no encoding, then the method may proceed to block 2012 where the analog signal may be converted to digital via a multi-channel A/D converter. According to an example embodiment, the method from either block 2010 or block 2012 may proceed to block 2016 where routing functions may be controlled by the input splitter/router module 216 in combination with the multi-channel bus 242 and the summing/mixing/routing nodes 244. According to multiple example embodiments of the disclosure, after block 2016, any number of unique combinations of routing and combining of the signals may be provided by the audio microprocessor 212. The routing and combining may involve processing of the digital signals from any, all, or none of blocks 2018-2026. For example, the multiple channels of audio may all be routed through the leveling amps 218 and the multi-channel pre-amps with rapid level control, but some of the channels may also be routed through the crossovers 220 and/or the delay module 222. In other example embodiments, all channels may be routed through all of the modules 218-226 (corresponding to blocks 2018-2026 in FIG. 20), but only certain channels may be processed by the modules.

According to an example embodiment of the disclosure, block 2014 depicts video information that may be paired with audio files.

After the processing of the signals, the method 2000 continues to D/A block 2028 where the digital signals may be converted to analog before further routing. The method may continue to block 2030 where the analog signals can be pre-amplified by either a pre-amp, a solid state preamp, or a mix of solid state and preamps. According to one example embodiment, the output preamp of block 2030 may also be bypassed. The pre-amplified or bypassed signal may then continue to one or more paths as depicted in block 2032. In one example embodiment, the signals may be output amplified by multi-channel output amplifiers 230 before being sent to the output terminals. According to an example embodiment, multi-channel output amplifiers may include 6 or more power amplifiers. According to another example embodiment, the signals may be output amplified by output stages 248 before being routed to the output terminals. In yet another example embodiment, the signals may be sent to a multi-channel wireless transmitter 250 for transmitting to wireless speakers. In this embodiment, line-level signals can be sent to the wireless transmitter, and the warmth of the preamps 246 may still be utilized for the signals routed to separate amplifiers in the wireless speakers. According to another example embodiment, and with reference to block 2032, any combination of the output paths described above can be provided including wireless, tube output, solid state output, and mix of the wireless, tube, and solid state outputs. The method of FIG. 20 ends at block 2034, but it should be apparent that the method is dynamic and may continuously repeat, particularly from block 2016 to block 2028 as the system operates.

An additional method for controlling the apparent localization of sounds in a 3-dimensional listening environment will be further described below.

According to an example embodiment of the disclosure, the speakers or transducers utilized in the 3D-EA reproduction, may be mounted within headphones, and may be in communication with the 3-D Audio Converter/Amplifier 102 via one or more wired or wireless connections. According to another example embodiment, 3-D headphones may interface with the 3-D Audio Converter/Amplifier 102, or otherwise interface with other audio sources. For example, 3-D headphones may be connected to the 3-D audio converter/amplifier 102 via one or more wired or wireless connections. The wireless information for transmitting audio signals from the 3-D audio converter/amplifier 102 to the 3-D headphones may include the transmitter for wireless speakers 250. According to another embodiment, a multi-conductor output jack may be included in the output terminals 232 to provide amplified audio to the headphones so that separate amplifiers may not be required.

Figure 21:
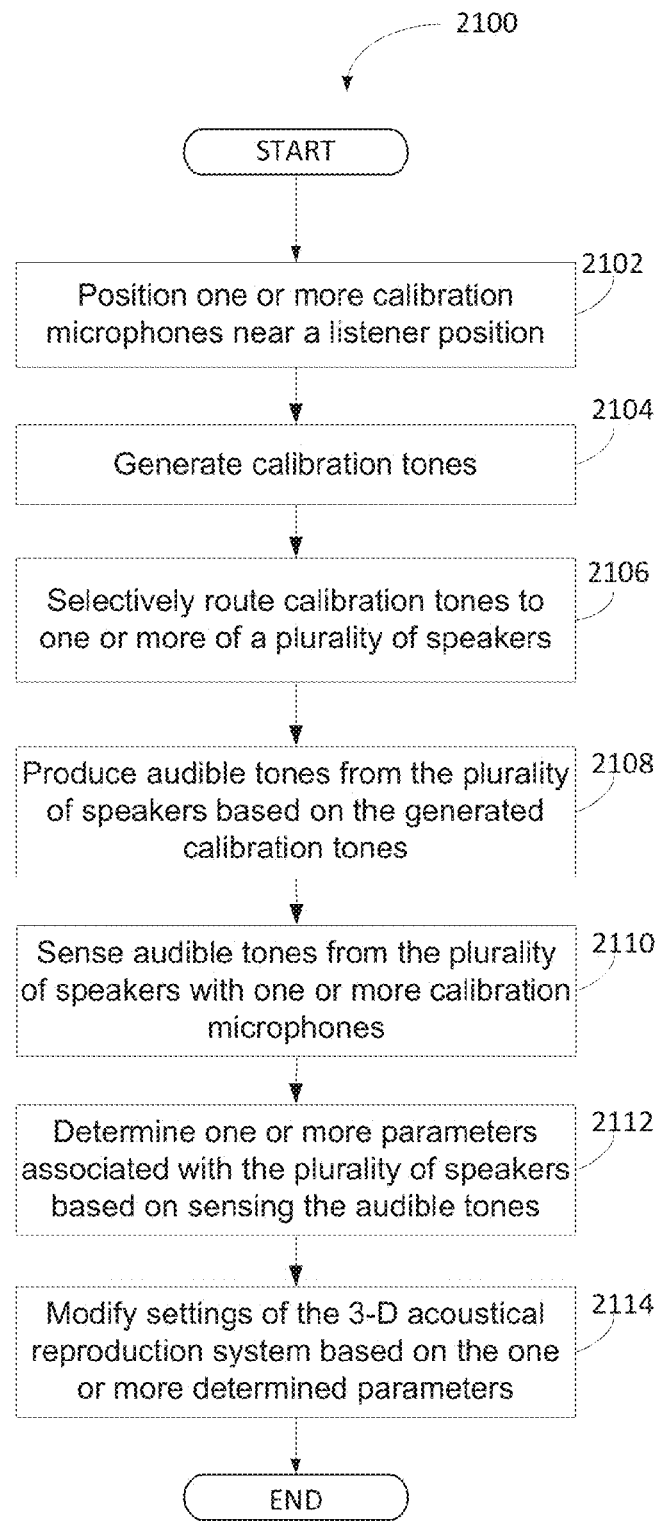

Another example method 2100 for initializing or calibrating a plurality of speakers in a 3-D acoustical reproduction system is shown in FIG. 21. According to an example embodiment of the disclosure, the method 2100 starts in block 2102 and includes positioning one or more calibration microphones near a listener position. In block 2104, the method 2100 includes generating calibration tones. In block 2106, the method 2100 includes, selectively routing calibration tones to one or more of the plurality of speakers. The method 2100 continues in block 2108 where it includes producing audible tones from the plurality of speakers based on the generated calibration tones. In block 2110, the method 2100 includes sensing audible tones from the plurality of speakers with the one or more calibration microphones. In block 2112, the method 2100 includes determining one or more parameters associated with the plurality of speakers based on sensing the audible tones. In block 2114, the method 2100 includes modifying settings of the 3-D acoustical reproduction system based on the one or more determined parameters. Method 2100 ends after block 2114.

Figure 22:
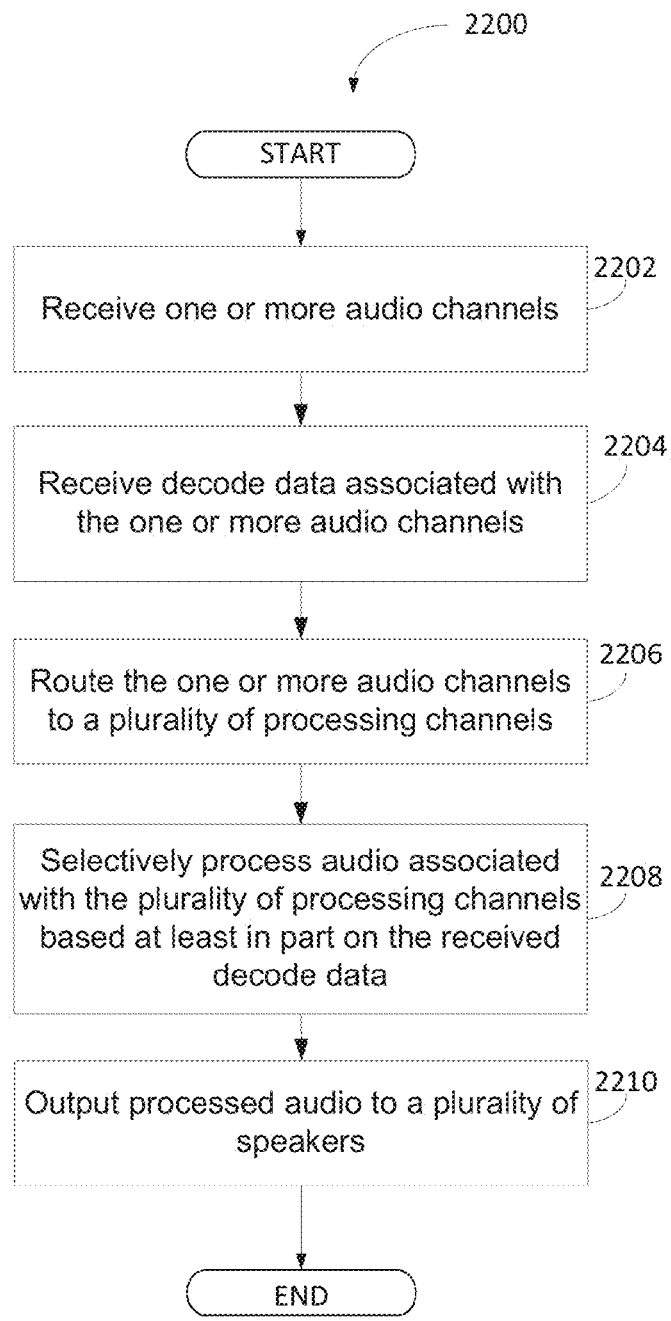
Figure 23:
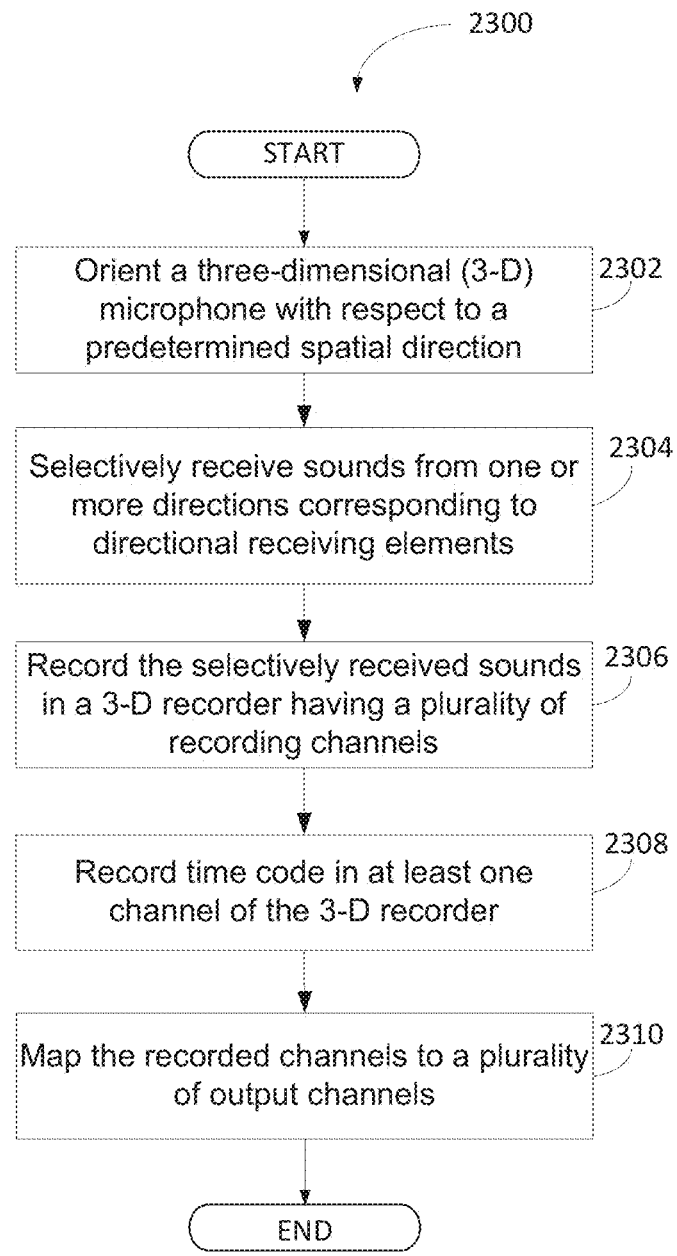

An example method 2200 for controlling the apparent location of sounds in a 3-dimensional listening environment is shown in FIG. 22. According to an example embodiment of the disclosure, the method 2200 starts in block 2202 and includes receiving one or more audio channels. In block 2204, the method includes receiving decode data associated with the one or more audio channels. In block 2206, the method includes routing the one or more audio channels to a plurality of processing channels. In block 2208, the method includes selectively processing audio associated with the plurality of processing channels based at least in part on the received decode data. In block 2210, the method includes outputting processed audio to a plurality of speakers. The method 2200 ends after block 2210.

Another example method 2300 for recording multi-dimensional audio can be provided in certain embodiments. The method 2300 may begin at block 2302, which includes orienting a three-dimensional (3-D) microphone with respect to a predetermined spatial direction. The method 2300 continues at block 2304, which includes selectively receiving sounds from one or more directions corresponding to directional receiving elements. The method 2300 continues at block 2306, which includes recording the selectively received sounds in a 3-D recorder having a plurality of recording channels. The method 2300 continues at block 2308, which includes recording time code in at least one channel of the 3-D recorder. And, the method 2300 continues at block 2310, which includes mapping the recorded channels to a plurality of output channels. The method 2300 may then end.

According to example embodiments of the disclosure, the 3-D audio converter/amplifier 102 may include one or more remote control receivers, transmitters, and/or transceivers for communicating wirelessly with one or more remote controls, one or more wireless microphones, and one or more wireless or remote speakers or speaker receiver and amplification modules. In an example embodiment, the wireless or remote speaker receiver and amplification modules can receive 3D-EA signals from a wireless transmitter 250, which may include capabilities for radio frequency transmission, such as Bluetooth. In another example embodiment the wireless transmitter 250 may include infrared (optical) transmission capabilities for communication with a wireless speaker or module. In yet another example embodiment, the power supply 202 may include a transmitter, such as an X10 module 254, in communication with the output D/A converter 228 or the pre-amp 246, for utilizing existing power wiring in the room or facility for sending audio signals to remote speakers, which may have a corresponding X10 receiver and amplifier.

In an example embodiment, a wireless or wired remote control may be in communication with the 3-D audio converter/amplifier 102. In an example embodiment, the a wireless or wired remote control may communicate with the 3-D audio converter/amplifier 102 to, for example, setup speaker calibrations, adjust volumes, setup the equalization of the 3D-EA sound in the room, select audio sources, or to select playback modes. In another example embodiment, the wireless or wired remote control may communicate with the 3-D audio converter/amplifier 102 to setup a room expander feature, or to adjust the size of the 3D-EA listening sphere or dome 512. In another example embodiment, the wireless or wired remote control may comprise one or more microphones for setting speaker calibrations.

The configuration and arrangement of the modules shown and described with respect to the accompanying figures are shown by way of example only, and other configurations and arrangements of system modules can exist in accordance with other embodiments of the disclosure.

According to an example embodiment, the disclosure may be designed specifically for computer gaming and home use. According to another example embodiment, the disclosure may be designed for professional audio applications, such as in theaters and concert halls.

Embodiments of the disclosure can provide various technical effects which may be beneficial for listeners and others. In one aspect of an embodiment of the disclosure, example systems and methods, when calibrated correctly, may sound about twice as loud (+6 dB) as stereo and/or surround sound yet may only be approximately one sixth (+1 dB) louder.

In another aspect of an embodiment of the disclosure, example systems and methods may provide less penetration of walls, floors, and ceilings compared to conventional stereo or surround sound even though they may be approximately one-sixth louder. In this manner, an improved sound system can be provided for apartments, hotels, condos, multiplex theaters, and homes where people outside of the listening environment may want to enjoy relative quiet.

In another aspect of an embodiment of the disclosure, example systems and methods can operate with standard conventional stereo sound formats.

In another aspect of an embodiment of the disclosure, example systems and methods can operate with a variety of conventional sound sources including, but not limited to, radio, television, cable, satellite radio, digital radio, CDs, DVDs, DVRs, video games, cassettes, records, Blue Ray, etc.

In another aspect of an embodiment of the disclosure, example systems and methods may alter the phase to create a sense of 3-D movement.

Example Methods for Creating a Data File

Figure 24:
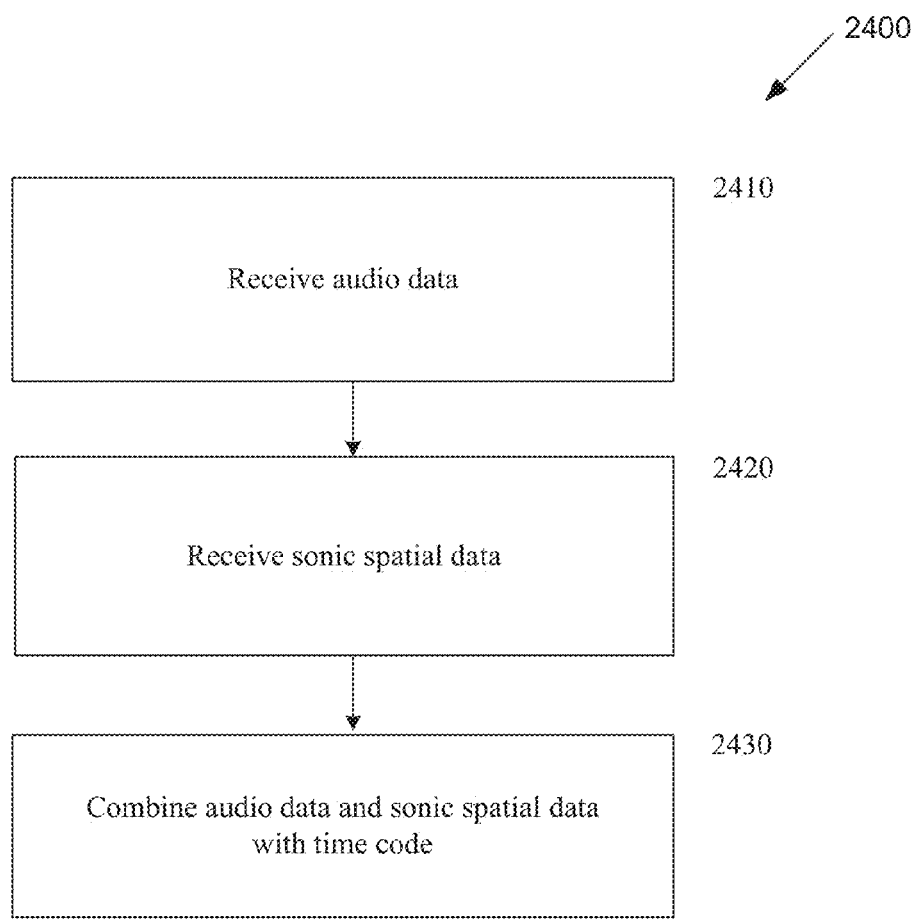

An example method for using a controller interface component device, such as 700, is illustrated in FIG. 24. The method 2400 begins at block 2410, in which audio data is received.

Block 2410 is followed by block 2420, in which sonic spatial data is received.

Block 2420 is followed by block 2430, in which the audio data and sonic spatial data are combined with at least one time code.

Figure 25:
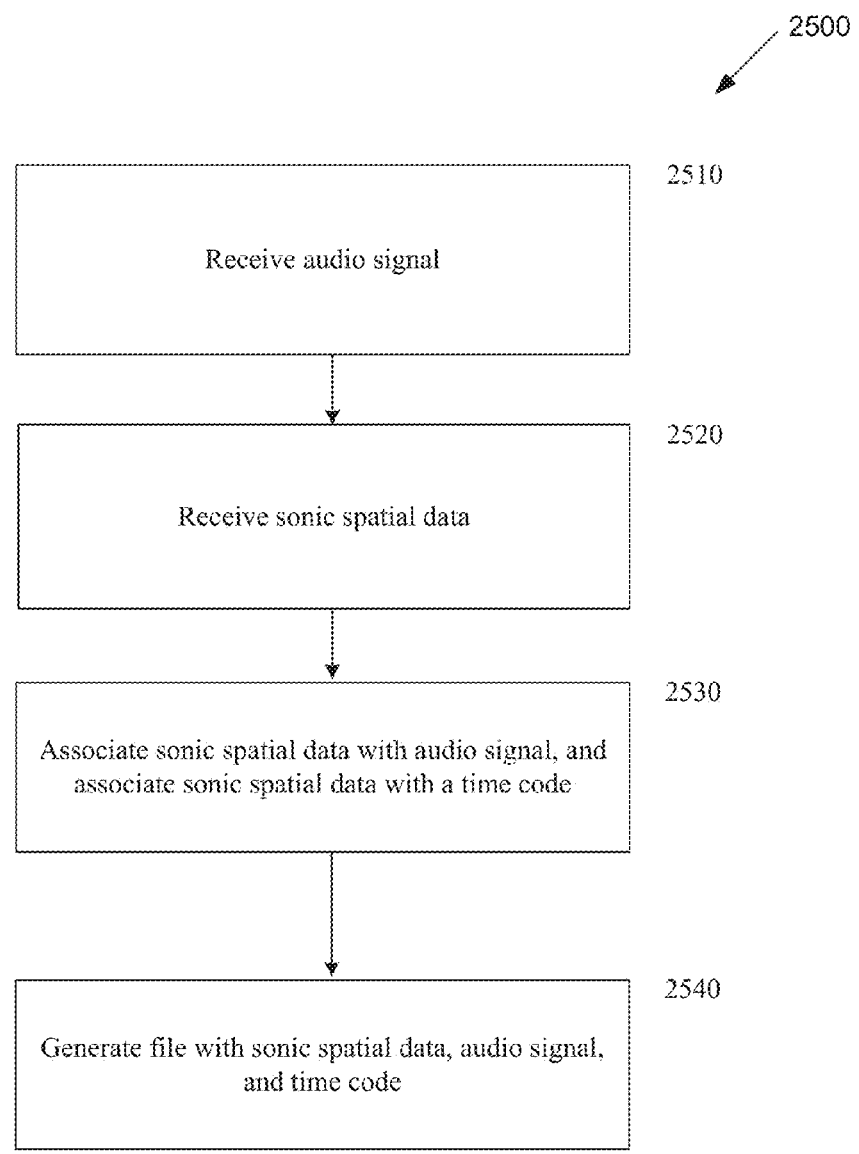

FIG. 25 illustrates an example method flow chart for recording a sound file according to an embodiment of the disclosure. Using sonic spatial data (SSD), a user can record a sound file with other audio signals, or otherwise generate a 3-D sound recording formatted file. The method 2500 can begin at block 2510, in which an audio signal is received. For example, an audio signal can be a mono or stereo signal. In certain instances, the audio signal can be a pre-recorded mono or stereo signal stored in a data storage device or audio file, or can be a live or otherwise delayed mono or stereo signal received from an audio source. In the embodiment of FIG. 25, a 3-D audio playback unit, similar to 300 in FIG. 3, or interface controller can be used to receive an audio signal. In certain embodiments, the unit 300 or interface controller can store the audio signal for subsequent playback or processing.

Block 2510 is followed by block 2520, in which sonic spatial data is received. For example, sonic spatial data can include 12 data points including, but not limited to, 6 volume levels and 6 delay levels, 1 each for 6 speakers in a speaker arrangement shown in the listening environments 400 of FIG. 4 or 500 of FIG. 5. In certain embodiments, for 6.1 audio output, a sub-channel can be summed and used as another data point for the sonic spatial data. In the embodiment of FIG. 25, a 3-D audio playback unit, similar to 300 in FIG. 3, or interface controller can be used to receive sonic spatial data. The unit 300 or interface controller may be in communication with one or more input control devices, similar to 800 in FIGS. 8-14, or foot pedals, which may receive one or more user inputs with respect to sonic spatial data. In certain embodiments, the unit 300 or interfaced controller can store the sonic spatial data for subsequent playback or processing.

Block 2520 is followed by block 2530, in which the sonic spatial data is associated with the audio signal, and the sonic spatial data is further associated with a time code. In the embodiment of FIG. 25, a 3-D audio playback unit, similar to 300 in FIG. 3, or interface controller can associate the sonic spatial data with the audio signal. Further, the unit 300 or interface controller can associate the sonic spatial data with a time code. In any instance, the unit 300 or interface controller can be used to independently control and adjust, in real time, some or all of the 12 data points.

Block 2530 is followed by block 2540, in which a file is generated to store the sonic spatial data, audio signal, and time code. In the embodiment of FIG. 25, a 3-D audio playback unit, similar to 300 in FIG. 3, or interface controller can generate the file to store the sonic spatial data, audio signal, and time code.

In one embodiment, one or more channels of the 3-D audio playback unit, similar to 300 in FIG. 3, or interface controller can play or otherwise record an audio data file, spatial data file, encoded audio file, 3D-EA audio output file, or similar file through a respective pre-assigned preset button.

In one embodiment, an audio data file, spatial data file, encoded audio file, or 3D-EA audio output file can be interchangeable, recordable, playable, and savable.

Example Methods for Using Input Device

Figure 26:
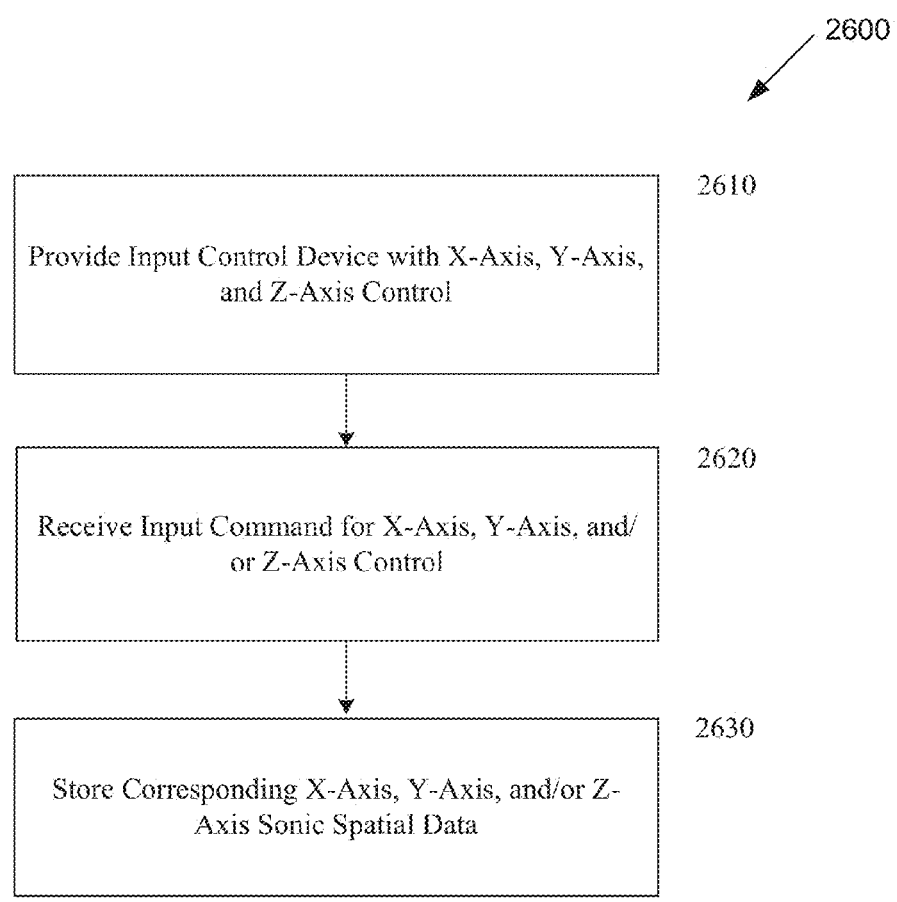

FIG. 26 illustrates an example method flow chart for controlling and storing sonic spatial data according to an embodiment of the disclosure. The method 2600 can begin at block 2610, in which an input control device with X-, Y-, and/or Z-axis control can be provided. For example, an input control device, such as 800 shown in FIGS. 8-14, can be provided.

Block 2610 is followed by block 2620, in which an input command for X-, Y-, and/or Z-axis control can be received. For example, a user can manipulate the input control device 800 to input a command with respect to the X-, Y-, and/or Z-axis.

Block 2620 is followed by block 2630, in which corresponding X-, Y-, and/or Z-axis sonic spatial data can be stored. For example, the input control device 800 can store the X-, Y-, and/or Z-axis inputs from the user, and the input control device 800 and/or associated computer-executable instructions can translate the inputs to corresponding sonic spatial data.

According to example embodiments of the disclosure, the 3-D audio converter/amplifier 102 may include one or more remote control receivers, transmitters, and/or transceivers for communicating wirelessly with one or more remote controls, one or more wireless microphones, and one or more wireless or remote speakers or speaker receiver and amplification modules. In an example embodiment, the wireless or remote speaker receiver and amplification modules can receive 3D-EA signals from a wireless transmitter 250, which may include capabilities for radio frequency transmission, such as Bluetooth. In another example embodiment the wireless transmitter 250 may include infrared (optical) transmission capabilities for communication with a wireless speaker or module. In yet another example embodiment, the power supply 202 may include a transmitter, such as an X10 module 254, in communication with the output D/A converter 228 or the pre-amp 246, for utilizing existing power wiring in the room or facility for sending audio signals to remote speakers, which may have a corresponding X10 receiver and amplifier.

In an example embodiment, a wireless or wired remote control may be in communication with the 3-D audio converter/amplifier 102. In an example embodiment, the a wireless or wired remote control may communicate with the 3-D audio converter/amplifier 102 to, for example, setup speaker calibrations, adjust volumes, setup the equalization of the 3D-EA sound in the room, select audio sources, or to select playback modes. In another example embodiment, the wireless or wired remote control may communicate with the 3-D audio converter/amplifier 102 to setup a room expander feature, or to adjust the size of the 3D-EA listening sphere or dome 512. In another example embodiment, the wireless or wired remote control may comprise one or more microphones for setting speaker calibrations.

The methods disclosed herein are by way of example only, and other methods in accordance with embodiments of the disclosure can include other elements or steps, including fewer or greater numbers of element or steps than the example methods described herein as well as various combinations of these or other elements.

While the above description contains many specifics, these specifics should not be construed as limitations on the scope of the disclosure, but merely as exemplifications of the disclosed embodiments. Those skilled in the art will envision many other possible variations that are within the scope of the disclosure.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments of the disclosure can provide certain systems and methods that transform encoded audio electronic signals into time-varying sound pressure levels. Example embodiments of the disclosure can provide the further systems and methods that transform positional information to directional audio.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention can include:

1. A system comprising:
   at least one processor in communication with at least one memory, the at least one processor operable to execute computer-executable instructions;
   an input device operable to:
      receive a user input corresponding with sonic spatial data in a predefined listening environment; and
      transmit the user input to at least one processor; and
   the computer-executable instructions operable to:
      receive the user input;
      convert the user input to sonic spatial data by independently adjusting at least one of first and second data points in the sonic spatial data, the first set of data points corresponding to a plurality of independently adjustable volume levels and the second set of data points corresponding to a plurality of independently adjustable delay levels;
      associate the sonic spatial data with a time code; and
      store the sonic spatial data, audio signal, and time code.

2. The system of claim 1, wherein the computer-executable instructions are further operable to:
   format the sonic spatial data, audio signal, and time code for storage to a 3D-EA audio output file.

3. The system of claim 1, wherein the input device comprises at least one of the following: a foot pedal, a joystick device, a hand controlled device, light sensor, a gesture control device, or a voice input device.

4. The system of claim 1, wherein the user input comprises X, Y, and Z-axis coordinate data.

5. The system of claim 1, wherein the computer-executable instructions operable to convert the user input to sonic spatial data comprises computer-executable instructions operable to:
   determine at least one adjustment to volume or delay in the audio signal.

6. A method comprising:
   receiving a user input via an input device, wherein the user input indicates an X-axis direction or a Y-axis direction corresponding to sonic spatial data associated with an audio signal;
   receiving an additional user input via the input device, wherein the additional user input indicates a Z-axis direction corresponding to sonic spatial data associated with an audio signal; and
   converting the received user inputs to sonic spatial data by independently adjusting at least one of first and second data points in the sonic spatial data, the first set of data points corresponding to a plurality of independently adjustable volume levels and the second set of data points corresponding to a plurality of independently adjustable delay levels.

7. The method of claim 6, further comprising:
   storing the sonic spatial data with an audio signal and a time code in a 3D-EA audio output file.

8. The method of claim 6, further comprising:
   formatting the sonic spatial data with an audio signal and a time code for storage in a 3D-EA audio output file.

9. The method of claim 6, wherein the input device comprises a pedal mounted to a stick supported by a support base, and further wherein the input device comprises a sliding mechanism operable to slide the pedal with respect to the support base.

10. The method of claim 6, wherein the input device comprises a locking mechanism operable to limit sliding of the pedal with respect to the support base.

11. The method of claim 6, wherein the input device comprises at least one of the following: a foot pedal, a joystick device, light sensor, a hand controlled device, a gesture control device, or a voice input device.

* * * * *